United States Patent
Shin

(10) Patent No.: US 7,144,623 B2
(45) Date of Patent: Dec. 5, 2006

(54) THERMOPLASTIC ELASTOMER COMPOSITION AND SHEET, AND LAMINATE

(75) Inventor: Gakuji Shin, Mie-ken (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 10/948,782

(22) Filed: Sep. 24, 2004

(65) Prior Publication Data

US 2005/0119408 A1 Jun. 2, 2005

Related U.S. Application Data

(63) Continuation of application No. PCT/JP03/04901, filed on Apr. 17, 2003.

(30) Foreign Application Priority Data

| Apr. 19, 2002 | (JP) | 2002-117558 |
| May 30, 2002 | (JP) | 2002-156776 |
| Aug. 13, 2002 | (JP) | 2002-235384 |
| Oct. 21, 2002 | (JP) | 2002-305237 |
| Nov. 18, 2002 | (JP) | 2002-334108 |
| Dec. 24, 2002 | (JP) | 2002-372322 |

(51) Int. Cl.
*B32B 25/04* (2006.01)
*C08L 53/02* (2006.01)

(52) U.S. Cl. ............... 428/304.4; 428/423.1; 428/521; 428/523; 525/98; 525/99; 525/197

(58) Field of Classification Search ............... 525/98, 525/99, 197; 428/304.4, 423.1, 521, 523
See application file for complete search history.

(56) References Cited

U.S. PATENT DOCUMENTS

| 5,847,051 A * | 12/1998 | Hwo et al. ............ 525/98 |
| 6,176,510 B1 * | 1/2001 | Masubuchi et al. ...... 280/728.1 |
| 6,723,776 B1 * | 4/2004 | Sakaki et al. ............. 524/474 |
| 2006/0055089 A1 * | 3/2006 | Zhang et al. ............. 264/485 |

FOREIGN PATENT DOCUMENTS

| JP | 57-20344 | 2/1982 |
| JP | 58-141224 | 8/1983 |
| JP | 58-206644 | 12/1983 |
| JP | 59-018741 | 1/1984 |
| JP | 59-42949 | 3/1984 |
| JP | 59-131635 | 7/1984 |
| JP | 60-197741 | 10/1985 |
| JP | 63-272547 | 11/1988 |
| JP | 01-195040 | 8/1989 |
| JP | 02-258247 | 10/1990 |
| JP | 6-1888 | 1/1994 |
| JP | 06-136205 | 5/1994 |
| JP | 7-166012 | 6/1995 |
| JP | 08-003332 | 1/1996 |
| JP | 08-156153 | 6/1996 |
| JP | 08-258199 | 10/1996 |
| JP | 2000-6318 | 1/2000 |
| JP | 2000-6334 | 1/2000 |

OTHER PUBLICATIONS

Electronic Translation of JP 08-156153, Jun. 1996.*

* cited by examiner

*Primary Examiner*—Jeffrey Mullis
(74) *Attorney, Agent, or Firm*—Nixon & Vanderhye P.C.

(57) ABSTRACT

The present invention relates to a thermoplastic elastomer composition comprising:
(a) a block copolymer having a weight-average molecular weight of 80,000 to 1,000,000 which is represented by the general formula (I):

$$A(B-A)_n, \text{ and/or } (A-B)_n \quad (I)$$

wherein A is a block of a polymer of a vinyl aromatic hydrocarbon; B is a block of an elastomeric polymer; and n is an integer of 1 to 5, and/or
a hydrogenated block copolymer obtained by hydrogenating said block copolymer;
(b) a softening agent for hydrocarbon-based rubbers; and
(c) an olefin-based resin,
said component (a) being contained in an amount of 20 to 80% by weight, and said component (b) being contained in an amount of 20 to 80% by weight, both based on a total weight of the components (a) and (b), and said component (c) being contained in an amount of 1 to 300 parts by weight based on 100 parts by weight of a total amount of the components (a) and (b), and
a sheet comprising the thermoplastic elastomer composition and a laminate including the sheet.

34 Claims, No Drawings

THERMOPLASTIC ELASTOMER COMPOSITION AND SHEET, AND LAMINATE

CROSS REFERENCE TO RELATED APPLICATION

This application is a continuation of PCT/JP03/04901 filed Apr. 17, 2003.

TECHNICAL FIELD

The present invention relates to a thermoplastic elastomer composition, and more particularly, to a specific styrene-based thermoplastic elastomer composition having an excellent extrusion-moldability which is capable of forming a sheet which is excellent in scratch resistance and soft feeling; a sheet comprising the composition; and a laminate including the sheet.

BACKGROUND ARTS

Conventionally, vinyl chloride resins (PVC) have been extensively used in various applications such as automobile interior materials and sheets for construction. In particular, automobile interior sheets used as a skin layer of instrument panels, door trims, etc., have been made of soft polyvinyl chloride or a blended mixture of the soft polyvinyl chloride with other resins, or a laminate obtained by successively laminating a polyvinyl chloride layer whose surface is embossed into a leather-like pattern and a foam layer, and further, if required, a resin base layer.

However, the use of the vinyl chloride resins tend to cause various problems concerning reduction in weight of automobile parts, recyclability, needs of solving environmental problems such as easy-incineration property, heat resistance, cold resistance, anti-aging property, light resistance, odor and appearance with cheap feeling.

As the materials which are free from the above problems, there are known olefin-based thermoplastic elastomer compositions comprising a blended mixture comprising an ethylene-propylene-non-conjugated diene copolymer rubber and polypropylene in which a rubber component thereof is partially or completely dynamically crosslinked (hereinafter occasionally referred to merely as "TPO"). The above thermoplastic elastomer compositions are expected to provide useful alternative materials for vinyl chloride resins, and have been recently put into practice. As the TPO, for example, in Japanese Patent Application Laid-open (KOKAI) No. 6-1888, there is described a sheet-like molded product including an elastomer layer comprising a composition containing an olefin-based copolymer rubber, an olefin-based copolymer and a crystalline paraffin. In addition, in Japanese Patent No. 1658357, there has been proposed a laminate including a surface-embossed thermoplastic elastomer layer comprising a blended mixture of crosslinked TPO and an olefin-based resin, and a foam layer.

However, when the TPO is extrusion-molded into a sheet, a large amount of deposit, i.e., so-called gum, tends to be attached onto an outlet of an extrusion die or peripheral portions thereof, resulting in contaminated surface of the resultant molded product. Therefore, it has been required to stop operation of the extruder for cleaning the contaminated portions to remove deposit or gum therefrom, thereby causing problems such as deterioration in productivity. Thus, the TPO has problems on extrusion-moldability.

In addition, the resultant sheet tends to be deteriorated in scratch resistance and, therefore, becomes unusable in some applications. On the other hand, when the amount of resin components blended in the TPO is increased to enhance a scratch resistance thereof, the resultant composition has a high hardness and, therefore, fails to exhibit a desired soft feeling. To solve these problems, in Japanese Patent No. 2533147, there is described a laminate including a polyolefin-based thermoplastic elastomer layer, a primer layer having a specific composition and a top coat layer, and having excellent surface properties. However, such a laminate using the conventional TPO as a base material tends to be still unsatisfactory in scratch resistance even when any coating layer is provided thereon. Further, upon the extrusion molding, a large amount of deposit (gum) is attached onto an outlet of an extrusion die and peripheral portions thereof, resulting in contaminated surface of the resultant molded product. Therefore, it has also been required to stop operation of the extruder for cleaning the contaminated portions to remove deposit or gum therefrom, resulting in problems such as deterioration in productivity. In addition, when a mineral oil-based softening agent is blended in the resin composition to improve a softness thereof, the surface of the obtained molded product tends to become sticky owing to bleeding-out of the softening agent, so that the molded product might be unusable in some conditions or applications.

Further, when a sheet-like laminate using the conventional TPO as a base material is formed into a desired shape by ordinary secondary processing methods such as vacuum forming, pressure forming and stamping, the resultant products, especially those having a large drawing ratio, tend to suffer from problems such as occurrence of rupture and extremely small thickness due to lack of spreadability. Also, interior skin materials for instrument panels, door trims, etc., tend to be frequently provided on the surface thereof with emboss (embossed pattern) to attain a leather-like feeling or an anti-reflection property. When such sheet materials previously formed on the surface thereof with emboss (embossed pattern) are subjected to secondary processing such as vacuum forming, the resultant product tends to suffer from debossing (such a phenomenon that the depth of emboss (embossed pattern) is reduced), namely tends to undergo problems concerning retention of emboss (embossed pattern). To avoid the debossing, there has been proposed the method of conducting the vacuum forming process using a female metal die provided with emboss (embossed pattern). However, the above method has such a problem that the depth of emboss formed on the molded product is still insufficient as compared to that provided in the metal die.

On the other hand, it has been considered and attempted to use a styrene-based thermoplastic elastomer instead of the TPO. As such a styrene-based thermoplastic elastomer, there is known the composition comprising a hydrogenated derivative of a vinyl aromatic compound-conjugated diene compound block copolymer in combination with a mineral oil-based softening agent for rubbers, a propylene-based polymer and an inorganic filler, as described, for example, in Japanese Patent Application Laid-open (KOKAI) No. 58-206644. The styrene-based thermoplastic elastomer composition is excellent in softness, rubber elasticity and strength as well as moldability and, therefore, can be formed into products having a complicated shape by injection molding method, extrusion molding method, etc. However, when the styrene-based thermoplastic elastomer composition is formed into a sheet-like product by calendering method, it may be extremely difficult to form the composition into a sheet because of high stickiness thereof to calender rolls. Such an undesired phenomenon tends to be more remarkably caused with increase in amount of the softening agent blended, more specifically, when the mineral oil-based softening agent for rubbers is blended in an amount of not less than about 10 parts by weight based on 100 parts of a total amount of a styrene-based rubber and a polypropylene resin. However, the above blending weight ratio of the softening agent is a preferred range for the styrene-based thermoplastic elastomer composition comprising the above components. Therefore, it has been demanded to solve these problems without varying the preferred blending ratio.

Also, as materials used for calendering, there are known olefin-based thermoplastic elastomers prepared by blending an ethylene-based polymer resin and a higher fatty acid amide in an olefin-based copolymer rubber and a polypropylene-based polymer resin, as described, for example, in Japanese Patent No. 2985622. However, sheets obtained by calendering these materials tend to be deteriorated in scratch resistance and oil resistance.

The present invention has been accomplished in view of the above problems. A first object of the present invention is to provide a sheet comprising a thermoplastic elastomer having not only an excellent extrusion moldability but also excellent scratch resistance and soft feeling.

A second object of the present invention is to provide a laminate which is excellent in not only scratch resistance, oil resistance and soft feeling but also uniform spreadability and retention of emboss (embossed pattern).

A third object of the present invention is to provide a laminate which is excellent in not only scratch resistance, oil resistance and soft feeling but also uniform spreadability and retention of emboss (embossed pattern).

A fourth object of the present invention is to provide a laminate having excellent scratch resistance, oil resistance and soft feeling as well as good touch feeling which is free from gum formation and bleeding-out of softening agents.

A fifth object of the present invention is to provide a thermoplastic elastomer skin sheet that is free from gum formation upon molding, and excellent in scratch resistance, oil resistance and vacuum-forming property.

A sixth object of the present invention is to provide a thermoplastic elastomer composition having excellent oil resistance, scratch resistance and mechanical properties as well as a good appearance without bleeding-out which is suitable for calendering.

DISCLOSURE OF THE INVENTION

In a first aspect of the present invention, there is provided a thermoplastic elastomer composition comprising:

(a) a block copolymer having a weight-average molecular weight of 80,000 to 1,000,000 which is represented by the general formula (I):

A(B-A)$_n$ and/or (A-B)$_n$     (I)

wherein A is a block of a polymer of a vinyl aromatic hydrocarbon; B is a block of an elastomeric polymer; and n is an integer of 1 to 5, and/or a hydrogenated block copolymer obtained by hydrogenating said block copolymer;

(b) a softening agent for hydrocarbon-based rubbers; and (c) an olefin-based resin 1, said component (a) being contained in an amount of 20 to 80% by weight, and said component (b) being contained in an amount of 20 to 80% by weight, both based on a total weight of the components (a) and (b), and said component (c) being contained in an amount of 1 to 300 parts by weight based on 100 parts by weight of a total amount of the components (a) and (b).

In a second aspect of the present invention, there is provided the thermoplastic elastomer composition according to the first aspect which further comprises (d) an olefin-based resin 2 other than said olefin-based resin 1 in an amount of 5 to 1,200 parts by weight based on 100 parts by weight of a total amount of the components (a) and (b).

In a third aspect of the present invention, there is provided the thermoplastic elastomer composition according to the first aspect which further comprises (e) a higher fatty acid amide in an amount of 0.03 to 3 parts by weight based on 100 parts by weight of a total amount of the components (a) and (b), said composition being dynamically heat-treated.

In a fourth aspect of the present invention, there is provided a thermoplastic elastomer composition which comprises:

(A) a thermoplastic elastomer obtained by dynamically heat-treating the thermoplastic elastomer composition as defined in the first aspect which contains 40 to 60% by weight of the component (a) and 60 to 40% by weight of the component (b), and further contains the component (c) in an amount of 10 to 30 parts by weight based on 100 parts by weight of a total amount of the components (a) and (b); and (B) a thermoplastic elastomer obtained by dynamically heat-treating the thermoplastic elastomer composition as defined in the first aspect which contains 40 to 60% by weight of the component (a) and 60 to 40% by weight of the component (b), and further contains the component (c) in an amount of 40 to 100 parts by weight based on 100 parts by weight of a total amount of the components (a) and (b), a ratio of the thermoplastic elastomer (A) to the thermoplastic elastomer (B) being in the range of 20:80 to 80:20.

In a fifth aspect of the present invention, there is provided a sheet comprising the thermoplastic elastomer composition as defined in any one of the above first to fourth aspects.

In a sixth aspect of the present invention, there is provided a thermoplastic elastomer skin sheet comprising the thermoplastic elastomer composition as defined in the fourth aspect.

In a seventh aspect of the present invention, there is provided a laminate with an embossed surface which comprises a layer comprising the thermoplastic elastomer composition as defined in any one of the first to fourth aspects, and a base layer.

In an eighth aspect of the present invention, there is provided a laminate comprising a layer comprising the thermoplastic elastomer composition as defined in any one of the first to fourth aspects, and a top coat layer.

The present invention is described in detail below. First, the thermoplastic elastomer composition according to the first aspect of the present invention as well as the thermoplastic elastomer sheet comprising the composition are explained.

The component (a) used in the first aspect of the present invention is a block copolymer having a weight-average molecular weight of 80,000 to 1,000,000, more specifically a block copolymer represented by the above general formula (I) and/or a hydrogenated block copolymer obtained by hydrogenating the above block copolymer.

In the above block copolymer, the vinyl aromatic hydrocarbon polymer block (A) constitutes a hard segment, and the elastomeric polymer block (B) constitutes a soft segment. Typical examples of the block copolymer may include block copolymers having a copolymerization structure represented by A-B or A-B-A in which double bonds of B may be partially or completely hydrogenated. These block copolymers are generally known as styrene-based thermoplastic elastomers.

Examples of the vinyl aromatic hydrocarbon contained in the vinyl aromatic hydrocarbon polymer block (A) may include styrene, α-methyl styrene, o-, m- or p-methyl styrene, 1,3-dimethyl styrene, vinyl naphthalene and vinyl anthracene. Of these vinyl aromatic hydrocarbons, especially preferred is styrene.

The elastomeric polymer block (B) is not particularly restricted as long as the block (B) exhibits an elastomeric property. Among them, preferred are conjugated dienes. Examples of the conjugated dienes may include butadiene, isoprene, 1,3-pentadiene and 2,3-dimethyl-1,3-butadiene. Of these conjugated dienes, especially preferred are butadiene, isoprene and mixtures comprising butadiene and isoprene at a weight ratio of 2:8 to 6:4.

The block copolymer contains the vinyl aromatic hydrocarbon polymer block in an amount of usually 10 to 50% by weight, preferably 15 to 45% by weight, more preferably 20 to 40% by weight. When the content of the vinyl aromatic hydrocarbon polymer block is less than the above-specified range, the resultant composition tends to be deteriorated in mechanical strength and heat resistance. On the other hand, when the content of the vinyl aromatic hydrocarbon polymer block exceeds the above-specified range, the resultant composition tends to be deteriorated in flexibility and rubber elasticity, and further tends to suffer from bleeding-out of the softening agent for hydrocarbon-based rubbers which may be blended in the below-mentioned component (b).

In the case where only butadiene is used as the conjugated diene, from the standpoint of maintaining a rubber elasticity of the thermoplastic elastomer, the elastomeric polymer block (B) contains 1,2-bond of the conjugated diene in an amount of usually 20 to 50%, preferably 25 to 45%.

Also, the component (a) is preferably a hydrogenated block copolymer obtained by hydrogenating the above block copolymer. The hydrogenation percentage of double bonds of the elastomeric polymer block (B) is usually not less than 30%, preferably not less than 50%, more preferably not less than 90%. When the hydrogenation percentage is less than the above-specified range, the resultant composition tends to be deteriorated in weather resistance and heat resistance.

The block copolymer has a weight-average molecular weight of 80,000 to 1,000,000, preferably 100,000 to 500,000, more preferably 150,000 to 400,000 calculated as a molecular weight of polystyrene as measured by gel permeation chromatography. When the weight-average molecular weight of the block copolymer is less than 80,000, the resultant composition tends to be deteriorated in not only rubber elasticity and mechanical strength but also moldability. On the other hand, when the weight-average molecular weight of the block copolymer exceeds 1,000,000, the resultant composition tends to be deteriorated in moldability.

The above block copolymer may be produced by any preferable method as long as the copolymer having the above structure and physical properties is produced thereby. Examples of such a method may include the method as described in Japanese Patent Publication (KOKOKU) No. 40-23798, namely there may be used the method of conducting block polymerization in an inert solvent in the presence of a lithium catalyst. On the other hand, hydrogenation treatment for production of the hydrogenated block copolymer may be conducted in an inert solvent in the presence of a hydrogenation catalyst by the methods described, for example, in Japanese Patent Publication (KOKOKU) No. 42-8704, Japanese Patent Publication (KOKOKU) 43-6636, Japanese Patent Application Laid-Open (KOKAI) No. 59-133203 and Japanese Patent Application Laid-Open (KOKAI) No. 60-79005.

In addition, the above block copolymer may also be produced by polymerizing styrene or a derivative thereof with the elastomeric block, and then coupling the resultant polymer with a coupling agent, or by polymerizing the elastomeric block using a dilithium compound as an initiator, and then sequentially polymerizing the resultant polymer with styrene or a derivative thereof.

Examples of commercially available products of the above block copolymer may include "KRATON-G" produced by Kraton Polymers, "SEPTON" produced by Kuraray Co., Ltd., and "TOUGHTEC" produced by Asahi Kasei Corporation.

The component (b) used in the first aspect of the present invention is a softening agent for hydrocarbon-based rubbers. As the softening agent for hydrocarbon-based rubbers, there may be preferably used hydrocarbons having a weight-average molecular weight of usually 300 to 2,000, preferably 500 to 1,500. The preferable softening agent are mineral oil-based hydrocarbons and synthetic resin-based hydrocarbons.

In general, the mineral oil-based softening agent for rubbers is in the form of a mixture comprising aromatic hydrocarbon, naphthene-based hydrocarbon and paraffin-based hydrocarbon. Hydrocarbon oils in which a content of carbon derived from aromatic hydrocarbons is not less than 35% by weight are called "aromatic-based oils"; hydrocarbon oils in which a content of carbon derived from naphthene-based hydrocarbons is 30 to 45% by weight are called "naphthene-based oils"; and hydrocarbon oils in which a content of carbon derived from paraffin-based hydrocarbons is not less than 50% by weight are called "paraffin-based oils". In the present invention, of these oils, the paraffin-based oils are preferably used.

The paraffin-based oils have a kinematic viscosity of usually 20 to 800 cst (centistokes), preferably 50 to 600 cst as measured at 40° C.; a pour point of usually 0 to −40° C., preferably 0 to −30° C.; and a flash point (COC) of usually 200 to 400° C., preferably 250 to 350° C. The softening agent (b) for hydrocarbon-based rubbers contributes to not only enhancement in fluidity of the resultant composition and, therefore, improvement in moldability thereof, but also enhancement in flexibility of the obtained sheet.

The component (c) used in the first aspect of the present invention is an olefin-based resin. Examples of the olefin-based resin may include propylene-based resins, ethylene-based resins, crystalline polybuten-1 resins, other ethylene-based resins such as ethylene-vinyl acetate copolymers, ethylene-(meth)acrylic acid copolymers and ethylene-(meth)acrylic acid ester copolymers. Of these olefin-based resins, preferred are propylene-based resins. Specific examples of the propylene-based resins may include propylene homopolymers, and propylene-ethylene random copolymer resins and propylene-ethylene block copolymer resins both containing propylene as a main component. The polymerization method for production of these olefin-based resins is not particularly restricted as long as resinous substances are produced thereby.

The above propylene-based resins have a melt flow rate of usually 0.05 to 200 g/10 min, preferably 0.1 to 100 g/10 min as measured at 230° C. under a load of 21.2 N according to JIS-K7210.

When the melt flow rate of the propylene-based resins is less than 0.05 g/10 min, the resultant composition tends to be deteriorated in moldability, so that the sheet obtained therefrom tends to have a poor appearance. When the melt flow rate is more than 200 g/10 min, the resultant composition tends to be deteriorated in mechanical properties, especially tensile strength at break. Also, when the melt flow rate is out of the above-specified range, a laminate obtained from the sheet tends to be deteriorated in uniform spreadability upon secondary processing thereof.

The thermoplastic elastomer composition according to the first aspect of the present invention contains the above respective components at the following blending ratios. That is, the component (a) is contained in an amount of 20 to 80% by weight, preferably 25 to 75% by weight based on the total weight of the components (a) and (b), and the component (b) is contained in an amount of 20 to 80% by weight, preferably 25 to 75% by weight based on the total weight of the components (a) and (b). When the content of the component (a) is less than 20% by weight (i.e., when the component (b) is more than 80% by weight), the resultant composition tends to be deteriorated in not only rubber elasticity but also resistance to bleeding-out of the softening agent. Further, a sheet obtained by calendering the thermoplastic elastomer composition tends to have a poor touch feeling. On the other hand, When the content of the component (a) is more than 80% by weight (i.e., when the component (b) is less than 20% by weight), the resultant composition tends to be deteriorated in flexibility, oil resistance and moldability, especially calendering property. The component (c) is contained in the composition in an amount of 1 to 300 parts by weight, preferably 10 to 100 parts by weight based on 100 parts by weight of a total amount of the components (a) and (b). When the content of the component (c) is less than one part by weight, the resultant composition tends to be deteriorated in moldability, especially calendering property. When the content of the component (c) is more than 300 parts by weight, the resultant composition tends to be deteriorated in flexibility and rubber elasticity.

The thermoplastic elastomer composition of the present invention may be dynamically heat-treated in the presence of a radical generator and/or a crosslinking agent. With such a dynamic heat treatment, the composition is preferably at least partially crosslinked. The crosslinked structure of the composition allows a laminate obtained therefrom to be improved in heat resistance, oil resistance, etc. TPO conventionally used as a surface layer material has been essentially required to undergo the dynamic heat treatment in the presence of a radical generator. Whereas, the thermoplastic elastomer composition of the present invention has a pseudo-crosslinking structure formed by the vinyl aromatic hydrocarbon polymer block, so that it is not necessarily required to subject the composition to the dynamic heat treatment. However, the thermoplastic elastomer composition of the present invention is preferably subjected to such a dynamic heat treatment since this treatment allows the laminate obtained from the composition to be improved in heat resistance and oil resistance.

The dynamic heat treatment used herein means that the composition is kneaded in a molten or semi-molten state. The dynamic heat treatment may be usually performed by uniformly mixing the above respective components with each other, and then melt-kneading the resultant mixture, if required, in the presence of a radical generator and/or a crosslinking agent as well as a crosslinking assistant. Examples of a mixing apparatus used in the dynamic heat treatment may include a Henschel mixer, a ribbon blender and a V-type blender. Also, examples of a kneading apparatus used in the dynamic heat treatment may include a mixing roll, a kneader, a Banbury mixer, a Brabender plastograph, and a single-screw or twin-screw extruder.

The radical generator and/or the crosslinking agent is used in an amount of usually 0.1 to 3 parts by weight, preferably 0.1 to 1 part by weight, and the crosslinking assistant is used in an amount of usually 0.1 to 5 parts by weight, preferably 0.1 to 3 parts by weight. The kneading temperature is in the range of usually 100 to 300° C., preferably 110 to 280° C., and the kneading time is usually 10 sec to 30 min, preferably 20 sec to 20 min. The condition of the material upon the dynamic heat treatment varies depending upon kinds of materials or temperature used in the dynamic heat treatment, and is usually a semi-molten or molten state, though not particularly limited thereto. The kneading procedure may be performed by the method of kneading the respective components with each other at one time, or the multi-stage divided kneading method of kneading optional components with each other, and then adding other remaining components thereto and kneading these components together.

Examples of the above radical generator may include azo compounds and organic peroxides. Of these radical generators, preferred are organic peroxides. Examples of the crosslinking agent may include organic peroxides, sulfur, phenol-based crosslinking agents, maleimide-based crosslinking agents, oximes and polyamines. Of these crosslinking agents, preferred are organic peroxides, phenol-based crosslinking agents and maleimide-based crosslinking agents, and more preferred are organic peroxides.

Specific examples of the organic peroxides may include dialkyl peroxides such as di-t-butyl peroxide, t-butylcumyl peroxide, dicumyl peroxide, 2,5-dimethyl-2,5-di(t-butylperoxy)hexane, 2,5-dimethyl-2,5-di(t-butylperoxy)hexyn-3,1,3-bis(t-butylperoxyisopropyl)benzene and 1,1-di(t-butylperoxy)-3,3,5-trimethylcyclohexane; peroxyesters such as t-butylperoxybenzoate, t-butylperoxyisopropyl carbonate, 2,5-dimethyl-2,5-di(benzoylperoxy)hexane and 2,5-dimethyl-2,5-di(benzoylperoxy)hexyn-3; diacyl peroxides such as acetyl peroxide, lauroyl peroxide, benzoyl peroxide, p-chlorobenzoyl peroxide and 2,4-dichlorobenzoyl peroxide; and hydroperoxides such as diisopropylbenzene hydroperoxide. Of these organic peroxides, preferred are organic peroxides having a 1 min-half life temperature of not less than 140° C. Specific examples of such preferred organic peroxides may include 1,3-bis(t-butylperoxyisopropyl)benzene, 2,5-dimethyl-2,5-di(t-butylperoxy)hexane and 2,5-dimethyl-2,5-di(t-butylperoxy)hexyn-3.

Examples of the crosslinking assistant may include peroxide-crosslinking assistants such as sulfur, p-quinone dioxime, p-dinitrosobenzene, 1,3-diphenyl guanidine and m-phenylenebismaleimide; polyfunctional vinyl compounds such as divinyl benzene, triallyl cyanurate, triallyl isocyanurate and diallyl phthalate; and polyfunctional (meth)acrylate compounds such as ethylene glycol di(meth)acrylate, diethylene glycol di(meth)acrylate, polyethylene glycol di(meth)acrylate, trimethylolpropane tri(meth)acrylate and allyl (meth)acrylate.

The above-described "partially crosslinked composition" means that the composition has a gel fraction (cyclohexane-insoluble content) of not less than 10% and less than 98% as measured by the following method. The composition having a gel fraction of not less than 98% is regarded as a completely crosslinked composition. The composition of the present invention preferably has a gel fraction of not less than 30%.

The gel fraction (cyclohexane-insoluble content) of the composition may be determined by the following method. That is, about 100 mg of the composition is weighed and then immersed in 50 mL of cyclohexane at 23° C. for 48 hours. Thereafter, the liquid is filtered, and the obtained filtration residue is dried at room temperature for 72 hours. According to these procedures, the gel fraction is calculated from the following symbols and formulae:

$W_{ini}$: Weight (mg) of thermoplastic elastomer initially weighed;

$W_{cini}$: Weight (mg) obtained by subtracting a weight of cyclohexane-soluble components (such as softening agent) and a weight of cyclohexane-insoluble components other than polymer components (such as fillers) from $W_{ini}$;

$W_{cxs}$: Weight (mg) of residual substances obtained after the composition is subjected to dissolution in cyclohexane, filtration and drying;

$W_{ccxs}$: Weight (mg) obtained by subtracting a weight of cyclohexane-insoluble components other than polymer components (such as fillers) from $W_{cxs}$;

$Fr_f$: Fraction of cyclohexane-insoluble components other than polymer components (such as fillers) which are contained in the thermoplastic elastomer; this fraction can be determined by measuring an ash content in the elastomer;

$Fr_s$: Fraction of cyclohexane-soluble components other than polymer components (such as softening agent) which are contained in the thermoplastic elastomer; this fraction can be determined by GPC; and G %: Gel fraction $$W_{cini}=W_{ini}\times(1-Fr_f-Fr_s)$$

$$W_{ccxs}=W_{cxs}-W_{ini}\times Fr_f$$

$$G\%=W_{ccxs}/W_{cini}\times 100$$

Also, the thermoplastic elastomer composition according to the first aspect of the present invention preferably contains an antioxidant. Examples of the antioxidant may include monophenol-based antioxidants such as 2,4-dimethyl-6-t-butyl phenol, 2,6-di-t-butyl phenol, 2,6-di-t-butyl-p-cresol, 2,6-di-t-butyl-4-ethyl phenol, 2,4,6-tri-t-butyl phenol, 2,5-di-t-butyl hydroquinone, butylated hydroxyanisole, n-octadecyl-3-(3',5'-di-t-butyl-4'-hydroxyphenyl)propionate and stearyl-β-(3,5-di-t-butyl-4-hydroxyphenyl)propionate; bisphenol-based antioxidants such as 4,4'-dihydroxydiphenyl, 2,2'-methylenebis(4-methyl-6-t-butylphenol), 2,2'-methylenebis(4-ethyl-6-t-butylphenol), 4,4'-methylenebis(2,6-di-t-butylphenol), 4,4'-butylidenebis(3-methyl-6-t-butylphenol) and 2,6-bis(2'-hydroxy-3'-t-butyl-5'-methylbenzyl)-4-methyl phenol; tri- or more polyphenol-based antioxidants such as 1,1,3-tris(2'-methyl-4'-hydroxy-5'-t-butylphenyl)butane, 1,3,5-trimethyl-2,4,6-tris(3',5'-di-t-butyl-4'-hydroxybenzyl)benzene, tris(3,5-di-t-butyl-4-hydroxyphenyl)isocyanurate, tris[β-(3,5-di-t-butyl-4-hydroxyphenyl) propionyloxyethyl]isocyanurate and tetrakis[methylene-3-(3',5'-di-t-butyl-4'-hydroxyphenyl) propionate]methane; thiobisphenol-based antioxidants such as 2,2'-thiobis(4-methyl-6-t-butylphenol), 4,4'-thiobis(2-methyl-6-t-butylphenol) and 4,4'-thiobis(3-methyl-6-t-butylphenol); naphthylamine-based antioxidants such as aldol-α-naphthylamine, phenyl-α-naphthylamine and phenyl-β-naphthylamine; diphenylaamine-based antioxidants such as p-isopropoxydiphenylamine; and phenylene diamine-based antioxidants such as N,N'-diphenyl-p-phenylene diamine, N,N'-di-β-naphthyl-p-phenylene diamine, N-cyclohexyl-N'-phenyl-p-phenylene diamine and N-isopropyl-N'-phenyl-p-phenylene diamine. Of these antioxidants, preferred are monophenol-based, bisphenol-based, tri- or more polyphenol-based and thiobisphenol-based antioxidants. The antioxidant may be used in an amount of usually 0.01 to 2 parts by weight, preferably 0.05 to 1 part by weight based on 100 parts by weight of a total amount of the components (a), (b) and (c).

Further, the thermoplastic elastomer composition according to the first aspect of the present invention may contain, if required, other components unless the addition thereof adversely affects the aimed objects of the present invention. Examples of the other components optionally blended in the composition may include various resins or rubbers; fillers such as glass fibers, carbon fibers, potassium titanate fibers, talc, mica, silica, titania, calcium carbonate and carbon black, heat stabilizers, light stabilizers, ultraviolet absorbers, neutralizing agents, lubricants, anti-fogging agents, anti-blocking agents, antistatic agents, dispersants, flame retardants, conductivity-imparting agents, and coloring agents. These optional components may be previously blended in any of the components (a), (b) and (c), or may be blended at an optional stage upon mixing the respective components, upon melt-kneading and upon the dynamic heat treatment.

Specific examples of the antistatic agents may include (1) cation-based antistatic agents such as primary amine salts, tertiary amines, quaternary ammonium compounds and pyridine derivatives; (2) anion-based antistatic agents such as sulfated oils, soaps, sulfated ester oils, sulfated amide oils, salts of sulfuric acid esters of olefins, salts of sulfuric acid esters of fatty alcohols, salts of alkyl sulfuric acid esters, ethylsulfonic acid salts of fatty acids, alkylnaphthalene-sulfonic acid salts, alkylbenzenesulfonic acid salts, sulfonic acid salts of succinic acid esters and salts of phosphoric acid esters; (3) nonionic-based antistatic agents such as partial fatty acid esters of polyhydric alcohols, ethyleneoxide adducts of fatty alcohols, ethyleneoxide adducts of fatty acids, ethyleneoxide adducts of fatty amines or fatty acid amides, ethyleneoxide adducts of alkyl phenols, ethyleneoxide adducts of alkyl naphthols, ethyleneoxide adducts of partial fatty acid esters of polyhydric alcohols and polyethylene glycol; and (4) amphoteric-based antistatic agents such as carboxylic acid derivatives and imidazoline derivatives. Of these antistatic agents, preferred are nonionic-based antistatic agents, and more preferred are polyoxyethylene alkyl amines, polyoxyethylene alkyl amides or fatty acid esters thereof, and glycerol fatty acid esters.

These antistatic agents may be used singly or in the form of a mixture of any two or more thereof. The antistatic agent may be blended in the composition in an amount of preferably about 0.03 to 2 parts by weight, more preferably about 0.04 to 1 part by weight based on 100 parts by weight of the-thermoplastic elastomer composition of the present invention. When the amount of the antistatic agent blended exceeds the above-specified range, the resultant thermoplastic elastomer composition tends to suffer from oozing-out on the surface thereof, and tends to be deteriorated in physical properties, etc.

The addition of the antistatic agent may provide molded products having an excellent flexibility and no stickiness. Thus, since the molded products are free from stickiness and bleeding-out of the softening agent, dusts or the like can be prevented from being attached thereonto. At the same time, since an electrification property of the molded products is reduced by an inherent effect of the antistatic agent, adhesion of dusts, etc., thereon due to the electrification also tends to be prevented.

Examples of thermoplastic resins other than the essential components which may be optionally blended in the composition, may include polyphenylene ether-based resins; polyamide-based resins such as nylon 6 and nylon 66; polyester-based resins such as polyethylene terephthalate and polybutylene terephthalate; polyoxymethylene-based resins such as polyoxymethylene homopolymers and polyoxymethylene copolymers; polymethyl methacrylate-based resins; and polystyrene-based resins.

Examples of the above rubbers as an optional component may include olefin-based rubbers such as ethylene-propylene copolymer rubbers and ethylene-propylene-non-conjugated diene copolymer rubbers; and styrene-based copolymer rubbers other than the essential components such as polybutadiene.

Next, the second aspect of the present invention is explained. The thermoplastic elastomer composition according to the second aspect of the present invention further comprises, in addition to the components of the thermoplastic elastomer composition according to the first aspect of the present invention, (d) an olefin-based resin 2 other than the olefin-based resin 1 (c) in an amount of 5 to 1,200 parts by weight based on 100 parts by weight of a total amount of the components (a) and (b).

The components (a), (b) and (c) used in the thermoplastic elastomer composition according to the second aspect of the present invention are identical to those described in the first aspect of the present invention.

The component (d) used in the second aspect of the present invention is an olefin-based resin other than the olefin-based resin (c). Examples of the olefin-based resin (d) may include those exemplified in the above component (c), namely propylene-based resins, ethylene-based resins, crystalline polybuten-1 resins, and other ethylene-based resins such as ethylene-vinyl acetate copolymers and ethylene-(meth)acrylic acid copolymers. From the standpoints of moldability or heat resistance upon sheet molding process, among these olefin-based resins 2, preferred are ethylene-based resins, and mixtures of an ethylene-based resin and a propylene-based resin. In particular, from the standpoints of moldability of the composition and uniform spreadability upon subjecting a sheet produced therefrom to vacuum forming, as the ethylene-based resins, there is more preferably used a mixture of an ethylene-based resin having a density of less than 0.910 g/cm$^3$, and an ethylene-based resin having a density of not less than 0.910 g/cm$^3$.

The blending ratio between the components (a), (b) and (c) in the thermoplastic elastomer composition according to the second aspect of the present invention is the same as described in the first aspect of the present invention.

The component (d) is blended in the composition in an amount of usually 5 to 1,200 parts by weight, preferably 10 to 1,000 parts by weight based on 100 parts by weight of a total amount of the components (a) and (b). When the amount of the component (d) blended is more than 1,200 parts by weight, the resultant laminate tends to be deteriorated in flexibility. When the amount of the component (d) blended is less than 5 parts by weight, the resultant laminate tends to be deteriorated in vacuum forming property.

The thermoplastic elastomer composition according to the second aspect of the present invention which contains the components (a), (b), (c) and (d) is preferably produced by dynamically heat-treating a mixture of the components (a) to (c) by a specific method, and then mixing the component (d) with the thus heat-treated mixture. The dynamic heat treatment may be conducted by the same method as explained in the first aspect of the present invention.

After the components (a) to (c) are dynamically heat-treated, the component (d) may be fed into a cylinder of an extruder through a feed port separately provided on a more downstream side of the extruder than an upstream side hopper, and then these components may be further heat-treated and mixed together. Alternatively, the component (d) may be blended and mixed in the components (a) to (c) upon molding the sheet as described later.

Thus, when the mixture containing the components (a), (b) and (c) and the radical generator is dynamically heat-treated to allow the mixture to be partially crosslinked, the component (d) may be omitted therefrom. As a result, since the amount of the resin component is reduced upon the crosslinking, radicals generated upon heating effectively acts on the component (a), thereby enhancing a crosslinking degree of the composition and, therefore, improving oil resistance and rubber elasticity thereof. In addition, in the case where propylene-based resins are used as the component (d) subsequently added, molecular chains of the resins hardly undergo cutting or break by the radicals, so that the resultant composition exhibits a high mechanical strength. In the case where ethylene-based resins are used as the component (d), the resins undergo no crosslinking reaction by the radial generator, so that formation of blobbing can be prevented, resulting in production of sheet-like molded products having a good appearance.

The thermoplastic elastomer composition according to the second aspect of the present invention may also contain the antioxidant and other components as explained in the first aspect of the present invention. The antioxidant and other components may be previously contained in any of the components (a), (b), (c) and (d), or may be blended therein upon uniformly mixing the respective components, upon melt-kneading or upon the dynamic heat treatment.

Next, the third aspect of the present invention is explained. The thermoplastic elastomer composition according to the third aspect of the present invention further comprises, in addition to the components of the thermoplastic elastomer composition according to the first aspect of the present invention, (e) a higher fatty acid amide in an amount of 0.03 to 3 parts by weight based on 100 parts by weight of a total amount of the components (a) and (b).

The components (a), (b) and (c) used in the thermoplastic elastomer composition according to the third aspect of the present invention are identical to those described in the first aspect of the present invention.

The component (e) used in the third aspect of the present invention is a higher fatty acid amide. Examples of the higher fatty acid amide may include saturated fatty acid amides such as lauramide, palmitamide, stearamide and behenamide; unsaturated fatty acid amides such as erucamide, oleamide and blaidamide and elaidamide; and bis-fatty acid amides such as methylenebisstearamide, methylenebisoleamide, ethylenebisstearamide and ethylenebisoleamide. Of these higher fatty acid amides, especially preferred are compounds having a melting point of 70 to 110° C. The component (e) may be previously blended in the respective components before the dynamic heat treatment, or may be blended therein after the dynamic heat treatment.

The thermoplastic elastomer composition according to the third aspect of the present invention may further contain (f) an olefin-based resin 3 in an amount of 5 to 200 parts by weight based on 100 parts by weight of a total amount of the components (a) and (b).

The component (f) used in the third aspect of the present invention is an olefin-based resin other than the olefin-based resin (c). The olefin-based resin may be selected from the same compounds as exemplified above as the olefin-based resins (c). From the standpoints of moldability or heat resistance upon sheet molding process, among the olefin-based resins, preferred are mixtures of an ethylene-based resin and a propylene-based resin. In particular, from the standpoints of good calendering property, as the ethylene-based resins, there may be more preferably used a mixture of an ethylene-based resin having a density of less than 0.910 g/cm$^3$, and an ethylene-based resin having a density of not less than 0.910 g/cm$^3$.

The blending ratio between the components (a), (b) and (c) in the thermoplastic elastomer composition according to the third aspect of the present invention is the same as described in the first aspect of the present invention.

The component (e) is blended in the composition in an amount of usually 0.03 to 3 parts by weight, preferably 0.04 to 2 parts by weight based on 100 parts by weight of a total amount of the components (a) and (b). When the amount of the component (e) blended is less than the above-specified range, the resultant composition tends to be deteriorated in calendering property. When the amount of the component (e) blended exceeds the above-specified range, the resultant molded product tends to suffer from bleeding-out of the higher fatty acid amide on the surface thereof, as well as deterioration in physical properties.

The component (f) is blended in the composition in an amount of usually 5 to 200 parts by weight, preferably 10 to 150 parts by weight based on 100 parts by weight of a total amount of the components (a) and (b). When the amount of the component (f) blended is more than 200 parts by weight, the resultant thermoplastic elastomer composition tends to be deteriorated in flexibility. When the amount of the component (f) blended is less than 5 parts by weight, the resultant composition tends to be deteriorated in calendering property.

The thermoplastic elastomer composition according to the third aspect of the present invention may also contain the antioxidant and other components as explained in the first aspect of the present invention. The antioxidant and other components may be previously blended in any of the components (a), (b) and (c), or may be blended therein upon uniformly mixing the respective components, upon melt-kneading or upon the dynamic heat treatment.

The thermoplastic elastomer composition according to the third aspect of the present invention which contains the components (a), (b) and (c) as well as the components (e) and (f) is preferably dynamically heat-treated and at least partially crosslinked. When being subjected to such a dynamic heat treatment, the composition can be enhanced in heat resistance and oil resistance. The dynamic heat treatment may be conducted by the same method as explained in the first aspect of the present invention.

Next, the thermoplastic elastomer composition according to the fourth aspect of the present invention is explained. The thermoplastic elastomer composition according to the fourth aspect of the present invention comprises (A) a thermoplastic elastomer obtained by dynamically heat-treating the thermoplastic elastomer composition as defined in the first aspect of the present invention which contains 40 to 60% by weight of the component (a) and 60 to 40% by weight of the component (b), and further contains the component (c) in an amount of 10 to 30 parts by weight based on 100 parts by weight of a total amount of the components (a) and (b) (hereinafter occasionally referred to merely as "TPS(A)"); and (B) a thermoplastic elastomer obtained by dynamically heat-treating the thermoplastic elastomer composition as defined in the first aspect of the present invention which contains 40 to 60% by weight of the component (a) and 60 to 40% by weight of the component (b), and further contains the component (c) in an amount of 40 to 100 parts by weight based on 100 parts by weight of a total amount of the components (a) and (b) (hereinafter occasionally referred to merely as "TPS(B)"), wherein a ratio of the thermoplastic elastomer (A) to the thermoplastic elastomer (B) is in the range of 20:80 to 80:20.

In the thermoplastic elastomer composition according to the fourth aspect of the present invention, the blending ratios of the respective components are as follows. That is, as to the oil-extended block copolymers constituting the TPS(A) and TPS(B), the component (a) and the component (b) are blended in an amount of 40 to 60% by weight and 60 to 40% by weight, respectively, based on 100% by weight of a total amount of the components (a) and (b), and the component (a) and the component (b) are preferably blended in an amount of 42 to 55% by weight and 58 to 45% by weight, respectively, based on 100% by weight of a total amount of the components (a) and (b). When the amount of the component (a) blended is less than 40% by weight, the thermoplastic elastomer skin sheet molded from the composition tends to be deteriorated in not only touch feeling but also resistance to bleeding-out of the softening agent. When the amount of the component (a) blended exceeds 60% by weight, the thermoplastic elastomer skin sheet molded from the composition tends to be deteriorated in oil resistance and extrusion moldability.

The TPS(A) contains the component (c) in an amount of 10 to 30 parts by weight, preferably 12 to 28 parts by weight based on 100 parts by weight of a total amount of the components (a) and (b). When the content of the component (c) in the TPS(A) is less than 10 parts by weight, the resin may be difficult to handle owing to problems such as occurrence of blocking between the TPS(A) resins, and the resultant composition tends to be deteriorated in moldability. When the content of the component (c) in the TPS(A) exceeds 30 parts by weight, the resultant composition tends to be deteriorated in flexibility and rubber elasticity.

The TPS(B) contains the component (c) in an amount of 40 to 100 parts by weight, preferably 42 to 90 parts by weight based on 100 parts by weight of a total amount of the components (a) and (b). When the content of the component (c) in the TPS(B) is less than 40 parts by weight, the resultant composition tends to be deteriorated in moldability. When the content of the component (c) in the TPS(B) exceeds 100 parts by weight, the resultant composition tends to be deteriorated in flexibility and rubber elasticity.

The thermoplastic elastomer composition according to the fourth aspect of the present invention may be produced by mixing the TPS(A) and the TPS(B) with each other. The TPS(A) is blended in an amount of 20 to 80% by weight, preferably 30 to 70% by weight based on 100% by weight of a total amount of the TPS(A) and the TPS(B). When the content of the TPS(A) in the composition is less than 20% by weight, the resultant composition tends to be deteriorated in flexibility and rubber elasticity, and the laminated obtained from the composition tends to be deteriorated in vacuum forming property (R-sag resistance). When the content of the TPS(A) in the composition exceeds 80% by weight, the resultant composition tends to be deteriorated in moldability, and the laminate obtained therefrom tends to be deteriorated in retention of emboss.

Also, in the case where the thermoplastic elastomer skin sheet is produced from not a blended mixture of the TPS(A) and TPS(B) but a simple mixture of the components (a), (b) and (c) which is obtained by mixing these components together at one time, even if the finally obtained composition contains the same components, the resultant laminate tends to be deteriorated in retention of emboss after the vacuum forming as well as vacuum forming property (R-sag resistance).

The thermoplastic elastomer composition according to the fourth aspect of the present invention preferably further contains (g) an olefin-based resin 4. As the olefin-based resin as the component (g), there may be used the same olefin-based resins as used as the component (a). In particular, from the standpoints of good moldability upon molding the sheet and uniform spreadability and good heat resistance upon vacuum forming, the use of mixtures of a propylene-based resin and an ethylene-based resin is preferred. As the ethylene-based resins, there may be more preferably used a mixture of an ethylene-based resin having a density of less than 0.910 g/cm$^3$, and an ethylene-based resin having a density of not less than 0.910 g/cm$^3$.

The component (g) is blended in the composition in an amount of usually 5 to 100 parts by weight, preferably 10 to 80 parts, more preferably 20 to 50 parts by weight by weight based on 100 parts by weight of a total amount of the TPS(A) and TPS(B). When the amount of the component (g) blended is less than 5 parts by weight, the resultant laminate tends to be deteriorated in scratch resistance. When the amount of the component (g) blended exceeds 100 parts by weight, the resultant laminate tends to be deteriorated in flexibility. Also, even if the finally obtained composition is constituted from the same components, the composition obtained by adding the component (g) to the separately prepared mixture of the TPS(A) and TPS(B) tends to hardly undergo heat deterioration upon kneading as compared to the thermoplastic elastomer composition that is merely increased in content of the olefin-based resin components in the TPS(A) and TPS(B), and the laminate obtained from the former composition can exhibit a higher moldability than that obtained from the latter composition.

The thermoplastic elastomer composition according to the fourth aspect of the present invention may also contain the antioxidant and other components as explained in the first aspect of the present invention. The antioxidant and other components may be previously blended in any of the components (a), (b) and (c), or may be blended therein upon uniformly mixing the respective components, upon melt-kneading or upon the dynamic heat treatment.

In the thermoplastic elastomer composition according to the fourth aspect of the present invention, the TPS(A) and TPS(B) are respectively produced by dynamically heat-treating the components (a) to (c). The dynamic heat treatment preferably allows a soft segment of the component (a) to be at least partially crosslinked. Although the TPS used in the present invention has pseudo-crosslinking points formed by a hard segment of the component (a), the number of the crosslinking points is limited. Therefore, when the soft segment of the component (a) has a crosslinked structure, the skin sheet molded from the thermoplastic elastomer composition can be enhanced in heat resistance and oil resistance. The dynamic heat treatment may be conducted by the same method as explained in the first aspect of the present invention.

After the components (a) to (c) are dynamically heat-treated, the component (g) may be fed into a cylinder of an extruder through a feed port separately provided on a more downstream side of the extruder than an upstream side hopper, and then these components may be further heat-treated and mixed together. Alternatively, the component (g) may be blended and mixed in the components (a) to (c) upon molding the sheet as described later.

Thus, after the mixture containing the components (a), (b) and (c) and the radical generator is dynamically heat-treated to allow the mixture to be partially crosslinked, the component (g) is added thereto. As a result, since the amount of the resin component upon the crosslinking is reduced, radicals generated upon the crosslinking effectively acts on the component (a), thereby enhancing a crosslinking degree of the resultant composition and, therefore, improving oil resistance and rubber elasticity thereof. In addition, in the case where propylene-based resins are used as the component (g) subsequently added, the resins hardly undergo cutting or break of molecular chains by the radicals, so that the resultant composition can exhibit a high mechanical strength. In the case where ethylene-based resins are used as the component (g), the resins undergo no crosslinking reaction by the radial generator, so that formation of blobbing can be prevented, resulting in production of sheet-like molded products having a good appearance.

Next, the thermoplastic elastomer sheet according to the fifth aspect of the present invention is explained. The thermoplastic elastomer sheet according to the fifth aspect of the present invention comprises the thermoplastic elastomer composition as defined in any of the above first to fourth aspects. The sheet is formed by extrusion molding method, calendering method, etc., in general using a calender roll, an extruder equipped with a T-die or a circular die, or a press-molding machine. In the present invention, there may be preferably used the extrusion-molding method in which after heat-melting the material in an extruder, the molten material is extruded from an extrusion die thereof. As the extrusion die, there may be usually used a T-die. The cylinder temperature, screw rotating speed and die temperature of the extruder, etc., may be appropriately determined in consideration of properties of the composition used. Also, the thickness of the sheet is not particularly restricted, and may be selected from the range as broad as 50 μm to 10 mm including such a case where the sheet is in the form of a film. The sheet of the present invention preferably has a thickness of 0.1 to 1 mm.

The thermoplastic elastomer sheet according to the fifth aspect of the present invention may be used in the form of a single sheet or a laminated sheet with the other materials by subjecting the sheet to secondary processing such as lamination-molding, thermoforming and vacuum forming. The thermoplastic elastomer sheet may be extensively used as preferable raw materials in various applications such as automobile parts, electric appliance parts, medical equipment parts, packaging materials, materials for construction and building, electric wires and sundries.

Next, the thermoplastic elastomer skin sheet according to the sixth aspect of the present invention comprises the thermoplastic elastomer composition as defined in the fourth aspect of the present invention is explained.

The thermoplastic elastomer composition according to the fourth aspect of the present invention is usually formed into a sheet by ordinary methods using a calender roll, an extruder equipped with a T-die or a circular die, or a press-molding machine. The embossing procedure (formation of embossed pattern) may be performed by the method in which the sheet formed using a calender roll, an extruder equipped with a T-die or a circular die, etc., is directly passed in a molten or semi-molten state between an embossing roll and a pressure roll such as a rubber roll, the method in which the sheet previously wound into a roll is re-heated by a heating drum or an infrared heater, and then passed between an embossing roll and a pressure roll such as a rubber roll, and the method in which the sheet is intermittently pressed by a metal die with emboss, as well as the method in which the sheet is embossed simultaneously with formation of the sheet by vacuum forming, using female and male metal dies with emboss. Meanwhile, the emboss means such a condition in which the surface of the sheet is embossed into irregular raised patterns such as leather-like patterns and geometrical patterns.

In addition, usually, the thermoplastic elastomer skin sheet of the present invention may be frequently laminated with a cushion material such as a polyolefin resin foam and then subjected to vacuum forming process. The lamination of the skin sheet with the foam sheet may be performed by overlapping the sheet-like thermoplastic elastomer extruded in a molten or semi-molten state with the foam sheet, and then passing the resultant laminate between a pair of rolls. At this time, the thermoplastic elastomer sheet and the foam sheet may be subjected to simultaneous lamination and embossing procedures by passing these sheets through the pair of rolls such that the thermoplastic elastomer sheet comes into contact with an embossing roll heated to about 30 to 70° C. whereas the foam sheet comes into contact with an ordinary unheated roll. Further, the thermoplastic elastomer sheet once extruded and cooled may be re-heated into a molten or semi-molten state, and then laminated with the foam sheet. In addition to the above methods, the lamination may also be performed using the method of pressing the sheet-like thermoplastic elastomer and the foam sheet which are overlapped with each other, and the method of forming the laminate by a two-layer injection-molding method, etc.

The thus formed laminate may be further laminated with an aggregate, a foam, a woven fabric, a nonwoven fabric, a cotton cloth, a paper, etc. In addition, the laminate may be formed on at least one surface thereof with a coating layer. Further, molded products obtained by forming these laminates into various shapes by vacuum forming method, pressure molding method, etc., are also involved within the scope of the skin sheet of the present invention.

The foam to be laminated on the thermoplastic elastomer skin sheet according to the sixth aspect of the present invention preferably comprises polyethylene-based resins, polypropylene-based resins or mixtures of these resins, more preferably comprises crosslinked products of these foams. The use of these foams enables production of laminates having an excellent soft feeling which include the foam sheet strongly bonded to the skin layer of the present invention. Examples of such foams may include crosslinked foams obtained using azido-based crosslinking agents or crosslinked foams obtained by radiation as described, for example, in Japanese Patent Publication (KOKOKU) Nos. 39-25500, 40-25351 and 40-25352. These crosslinked foams have been already put into the market. When the laminates are applied to automobile interior materials, the foams used therein preferably have an expansion ratio of about 5 to 50 times.

The thermoplastic elastomer skin sheet according to the sixth aspect of the present invention may be used, for example, as an interior skin material, in particular, a sheet-like skin material as an interior material for automobile parts, specifically a skin material for instrument panels, door trims, console boxes, ceiling sheets, steering wheel pads, etc., and a surface layer sheet for seats.

Next, the laminate according to the seventh aspect of the present invention is explained. The laminate according to the seventh aspect of the present invention comprises a layer comprising the thermoplastic elastomer composition and a base layer, and has an embossed surface.

As the thermoplastic elastomer composition, there may be used those described in the first to fourth aspects of the present invention. The thermoplastic elastomer composition used in the laminate is preferably dynamically heat-treated similarly to the composition as described in the first aspect of the present invention. In addition, as explained in the first to fourth aspects of the present invention, the thermoplastic elastomer composition used in the laminate may also contain the antioxidant and other components.

The material of the base layer used in the laminate according to the seventh aspect of the present invention may be appropriately selected according to properties required for the laminate. Examples of the material frequently used in the base layer may include polyolefin-based resins such as typically polypropylene and polyethylene; polyester-based resins such as typically polyethylene terephthalate and polybutylene terephthalate; polystyrene; styrene-based elastomers such as hydrogenated products of styrene-butadiene-styrene copolymers; papers; cloths; and metal foils such as aluminum sheet. These materials of the base layer may be used singly or in the form of a mixture of any two or more thereof. Further, as the material of the base layer, there may also used various copolymers. The materials usable in the base layer are not limited to the above-specified materials.

The base layer is preferably in the form of a foam layer. The foam layer preferably comprises polyethylene-based resins, polypropylene-based resins or mixtures of these resins, more preferably comprises at least partially crosslinked foams. The use of these foams enables production of laminates which include the foam layer strongly bonded to the thermoplastic elastomer layer of the present invention. Such crosslinked foams may be produced using azido-based crosslinking agents or by radiation as described in Japanese Patent Publication (KOKOKU) Nos. 39-25500, 40-25351 and 40-25352. As the crosslinked foams, there may be used commercially available crosslinked foams. When the laminates are applied to automobile interior materials, the foams used therein preferably have an expansion ratio of about 5 to 50 times.

The laminate according to the seventh aspect of the present invention includes the above thermoplastic elastomer layer whose surface is embossed, and the foam layer. The embossing process may be conducted, for example, by the following methods. That is, there may be used the method in which the sheet formed by extrusion molding method or calendering method is passed in a molten or semi-molten state between an embossing (embossed pattern-forming) roll and a pressure roll such as a rubber roll, the method in which the sheet previously wound into a roll is re-heated by a heating drum or an infrared heater, and then passed between an embossing (embossed pattern-forming) roll and a pressure roll such as a rubber roll, and the method in which the sheet is pressed by an metal die with embossed patterns, as well as the method in which the sheet is subjected to embossing (formation of embossed pattern) simultaneously with shaping of the sheet by vacuum forming method, using female and male metal dies with embossed patterns. Meanwhile, the emboss (embossed pattern) means such a condition in which the surface of the sheet is embossed into irregular raised patterns such as leather-like patterns and geometrical patterns.

Meanwhile, the emboss (embossed pattern) means such a conditioned in which the surface of the sheet is embossed into irregular raised patterns such as leather-like patterns and geometrical patterns.

The laminate according to the seventh aspect of the present invention which comprises the thermoplastic elastomer layer and the foam layer may be produced by overlapping the thermoplastic elastomer sheet in a molten or semi-molten state which is formed by extrusion molding method, calendering method, etc., with the foam sheet, and then passing the resultant laminate between a pair of rolls. At this time, the thermoplastic elastomer sheet and the foam sheet may be passed through the pair of rolls such that the thermoplastic elastomer sheet comes into contact with an embossing roll heated to about 30 to 70° C. whereas the foam sheet comes into contact with an ordinary unheated roll. Further, there may be used the method in which the thermoplastic elastomer sheet once extruded and cooled is re-heated into a molten or semi-molten state, and then laminated with the foam sheet by the same method as described above, the method of pressing the sheet-like thermoplastic elastomer and the foam sheet which are laminated with each other, and the method of forming the laminate using a two-layer injection-molding process.

The laminate according to the seventh aspect of the present invention may be further laminated with an aggregate, a foam, a woven fabric such as cotton cloth, a non-woven fabric, a paper, etc. In addition, the laminate may be formed on at least one surface thereof with a coating layer. Further, molded products obtained by forming these laminates into various shapes by vacuum forming method, pressure molding method, etc., are also involved within the scope of the laminate of the present invention.

The laminate according to the seventh aspect of the present invention may be formed into an embossed (embossed pattern-formed) sheet-like molded product with irregular raised patterns such as leather-like patterns and geometrical patterns. Specifically, the laminate may be suitably used as an interior skin material, especially a sheet-like skin material applicable to an interior material for automobile parts, more specifically, a skin material for instrument panels, door trims, console boxes, ceiling sheets, steering wheel pads, etc., as well as a sheet for seats.

Next, the laminate according to the eighth aspect of the present invention is explained. The laminate according to the eighth aspect of the present invention comprises a layer comprising the thermoplastic elastomer composition and a top coat layer.

As the thermoplastic elastomer composition, there may be used those described in the first to fourth aspects of the present invention. The thermoplastic elastomer composition used in the laminate is preferably dynamically heat-treated similarly to the composition as described in the first aspect of the present invention. In addition, as explained in the first to fourth aspects of the present invention, the thermoplastic elastomer composition used in the laminate according to the eighth aspect of the present invention may also contain the antioxidant and other components.

As the material of the top coat layer formed on the surface of the base material comprising the thermoplastic elastomer composition, there are preferably used those materials containing at least one resin selected from the group consisting of polyester resins, acrylic resins and polyurethane resins. As resins contained in a coating material for the top coat layer of the present invention, there may be preferably used urethane-based resins from the standpoint of good touch feeling of the surface of the resultant laminate.

The top coat layer may be formed by dissolving at least one resin selected from the group consisting of the above polyester resins, acrylic resins and polyurethane-based resins in an organic solvent, and then applying the thus obtained coating solution for the top coat layer onto the base material by an ordinary method.

The polyester resins used for forming the top coat layer basically comprise a polyhydric alcohol and a polybasic acid or an anhydride thereof. Examples of the polyhydric alcohol may include ethylene glycol, diethylene glycol, polyethylene glycol, propylene glycol, dipropylene glycol and polypropylene glycol. Examples of the polybasic acid or the anhydride thereof may include phthalic acid, phthalic anhydride, isophthalic acid, terephthalic acid, maleic acid, maleic anhydride, fumaric acid and itaconic acid. As the polyester resins, there may also be used alkyd resins or polyarylate resins. Examples of the acrylic resins may include polymers of (meth)acrylic acid esters such as methyl (meth)acrylate, ethyl (meth)acrylate, propyl (meth)acrylate and butyl (meth)acrylate, and copolymers obtained by copolymerizing the above compounds with styrenes such as styrene and α-methyl styrene, or carboxylic acids such as (meth)acrylic acid, crotonic acid, itaconic acid, fumaric acid and maleic acid according to requirements.

Further, as the polyurethane-based resins, there may be used polymers produced by reacting a hydroxyl group of polyol or diol compounds and block copolymers thereof with an isocyanate group of isocyanate compounds. Examples of the polyol compounds may include polyester polyols, polyether polyols and polycarbonate polyols. Examples of the polyisocyanates may include aliphatic polyisocyanates such as hexamethylene diisocyanate (HMDI), alicyclic polyisocyanates such as isophorone diisocyanate (IPDI), and aromatic polyisocyanate compounds such as diphenylmethanee-4,4'-diisocyanate (MDI) and hydrogenated MDI. In any case, it is preferable to use such polyurethane-based resins that are free from yellow discoloration, i.e., yellowing-free resins. All of the above polyurethane-based resins have been already put into the domestic market, and are readily available.

The coating solution for forming the top coat layer may contain, in addition to at least one compound selected from the group consisting of the above polyester resins, acrylic resins and polyurethane-based resins, silicic anhydride (silica), pigments, elastic beads and delustering agents, if required.

Examples of the organic solvent used for dissolving the above resins for forming the top coat layer therein may include methyl ethyl ketone, toluene, xylene, cyclohexanone and methylene chloride. The coating solution for the top coat layer has a solid concentration of 5 to 50% by weight, preferably about 10 to 15% by weight.

The top coat layer thus formed on the surface of the base material preferably has a thickness of 3 to 30 μm, more preferably about 10 to 20 μm. The coating amount of the top coat layer (under wetted condition) is preferably 30 to 300 g/m$^2$, more preferably 50 to 250 g/m$^2$.

In the laminate according to the eighth aspect of the present invention, prior to forming the top coat layer, a primer layer containing at least one compound selected from the group consisting of saturated polyesters, chlorinated polyolefins and hydroxy- or carboxyl-added chlorine-free polyolefin-based resins, may be formed on the surface of the base material comprising the thermoplastic elastomer, if required. When the primer layer is formed on the surface of the base material before forming the top coat layer thereon, there can be obtained a laminate comprising the thermoplastic elastomer composition whose surface is excellent in abrasion resistance and anti-tacking property. Among them, the preferred primers are chlorinated polyolefins and saturated polyesters in consideration of good adhesion to the base material comprising the thermoplastic elastomer composition and the top coat layer. The primer layer may be formed on the surface of the base material by dissolving at least one compound selected from the group consisting of saturated polyesters and chlorinated polyolefins in an organic solvent, and then applying the thus obtained coating solution for the primer layer onto the surface of the base material by an ordinary method.

Examples of the saturated polyester resins used for forming the primer layer may include polyethylene terephthalate, polybutylene terephthalate and derivatives thereof. Examples of the chlorinated polyolefins may include chlorinated polyethylene, chlorinated polypropylene and chlorinated polyethylene-α-olefin copolymers. Of these saturated polyester resins, chlorinated polypropylene is preferred from the standpoint of good heat resistance.

The coating solution for forming the primer layer may contain, in addition to the above saturated polyester resins and chlorinated polyolefins, if required, silica, pigments, elastic beads, delustering agents, etc.

Examples of the organic solvent used for dissolving the above saturated polyesters and chlorinated polyolefins therein may include toluene, methyl ethyl ketone, ethyl acetate and cyclohexane. The coating solution for forming the primer layer has a solid concentration of 2 to 50% by weight, preferably about 10 to 15% by weight.

The primer layer thus formed on the surface of the base material comprising the thermoplastic elastomer composition preferably has a thickness of 1 to 20 μm. The coating amount of the primer layer (under wetted condition) is preferably 10 to 200 g/m². When the above primer layer is formed on the thermoplastic elastomer base material, the coating solution for the primer layer may be dividedly applied a plurality of times. At this time, there may be used a plurality of coating solutions that are different in composition from each other within the ranges specified in the present invention.

In the laminate according to the eighth aspect of the present invention, prior to forming the top coat layer or the primer layer, the surface of the base material comprising the thermoplastic elastomer composition may be subjected, if required, to corona discharge treatment. The corona discharge treatment is one kind of discharge plasma treatment, and the discharge treatment may be conducted by disposing an electrode bar connected to a high frequency oscillator in an opposed relation to an object to be treated. In the corona discharge treatment, the output voltage is about 4 to 8 kV, and the treating time is about 5 to 100 sec. The base material thus subjected to the corona discharge treatment preferably has a wet tensile strength of 30 to 60 mN/m as measured according to JIS K6768. As the apparatus for the corona discharge treatment, there may be used commercially available corona discharge apparatuses.

The base sheet material comprising the thermoplastic elastomer composition may be produced by the method described in the fifth aspect of the present invention.

The primer layer and the top coat layer may be formed on the surface of the base material comprising the thermoplastic elastomer composition by ordinary methods. Examples of the methods may include known coating methods such as gravure roll coating method, roll coating method, knife coating method, screen coating method and spray coating method.

The laminate according to the eighth aspect of the present invention may be further laminated with an aggregate, a foam, a woven fabric, a nonwoven fabric, a cotton cloth, a paper, etc. Further, molded products obtained by forming these laminates into various shapes by vacuum forming method, pressure molding method, etc., are also involved within the scope of the laminate of the present invention. Also, the surface of the top coat layer may be delustered, or subjected to embossing process to form embossed patterns such as leather-like patterns thereon.

The laminate according to the eighth aspect of the present invention which comprises the layer comprising the thermoplastic elastomer as defined in any of the first to fourth aspect of the present invention and the top coat layer, is excellent in not only scratch resistance but also oil resistance, soft feeling and touch feeling without occurrence of bleeding-out of softening agents. Therefore, the laminate may be suitably used as an interior skin material, especially a sheet-like skin material applicable to an interior material for automobile parts, more specifically, a skin material for instrument panels, door trims, console boxes, ceiling sheets, steering wheel pads, etc., and a sheet for seats.

PREFERRED EMBODIMENT OF THE PRESENT INVENTION

The present invention is described in more detail by reference to the following Examples, but the following Examples are only illustrative and not intended to limit the scope of the present invention. In the following examples and comparative examples, the materials and evaluation methods used therein are as follows. Meanwhile, "%" means "% by weight".

<Materials>

Component (a):

(a1): Hydrogenated product of styrene-butadiene block copolymer having a copolymerization structure of styrene block-butadiene block-styrene block (styrene content: 33%; hydrogenation percentage: not less than 98%; weight-average molecular weight: 245,000);

(a2): Hydrogenated product of styrene-butadiene/isoprene block copolymer having a copolymerization structure of styrene block-butadiene/isoprene block-styrene block (styrene content: 30%; hydrogenation percentage: not less than 98%; weight-average molecular weight: 243,000);

(a3): Partially hydrogenated product of styrene-butadiene block copolymer having a copolymerization structure of styrene block-butadiene block-styrene block (styrene content: 31%; hydrogenation percentage: 56%; weight-average molecular weight: 100,000);

(a4): Hydrogenated product of styrene-butadiene block copolymer having a copolymerization structure of styrene block-butadiene block-styrene block (styrene content: 29%; hydrogenation percentage: not less than 98%; weight-average molecular weight: 47,000); and (a5): Hydrogenated product of styrene-butadiene block copolymer having a copolymerization structure of styrene block-butadiene block-styrene block (styrene content: 29%; hydrogenation percentage: not less than 98%; weight-average molecular weight: 75,000).

Component (b):

Paraffin-based oil (weight-average molecular weight: 746; kinematic viscosity at 40° C.: 382 cSt; pour point: −15° C.; flash point: 300° C; "PW380" produced by Idemitsu Kosan Co., Ltd.)

Component (c):

Propylene polymer resin (produced by Japan Polychem Corporation; melt flow rate: 0.9 g/10 min as measured at 2300C under a load of 21.2 N)

Component (d):

Mixture containing the following components (x) to (z) at a ratio of 1:1:1

(x): Propylene-ethylene block copolymer resin (produced by Japan Polychem Corporation; melt flow rate: 1.2 g/10 min as measured at 230° C. under a load of 21.2 N);

(y): Ethylene-based resin (produced by Japan Polychem Corporation; melt flow rate: 2.1 g/10 min as measured at 230° C. under a load of 21.2 N; density: 0.920 g/cm$^3$); and (z): Ethylene-based resin (produced by Japan Polychem Corporation; melt flow rate: 3.5 g/10 min as measured at 230° C. under a load of 21.2 N; density: 0.905 g/cm$^3$)

Component (e):

Oleamide ("DIAMIDE 0200" produced by Nippon Kasei Chemical Co., Ltd.)

Crosslinking Agent (POX):

1,3-bis(t-butylperoxyisopropyl)benzene ("PERCADOX 14" produced by Kayaku Akzo Corporation)

Crosslinking Assistant (DVB):

Divinyl benzene (produced by Sanyo Kasei Co., Ltd.; 55%-purity product)

Antioxidant:

Tetrakis[methylene-3-(3',5'-di-t-butyl-4'-hydroxyphenyl) propionate]methane ("IRGANOX 1010" produced by Ciba Specialty Chemicals Corp. (hereinafter occasionally referred to merely as "IX1010")

<Evaluation Methods>

In the following measurements, there was used a sheet specimen having a width of 250 mm and a thickness of 0.35 mm which was extrusion-molded from a T-die of a 45 mmφ extruder (with a single flight screw) manufactured by Watanabe Kakoki Co., Ltd., at a cylinder temperature of 190° C., a die temperature of 210° C. and a screw rotating speed of 70 rpm.

(1) Moldability:

In the case where the molding procedure was performed under the above molding conditions without any problems and the resultant extrusion-molded sheet was free from remarkable deterioration in appearance, the moldability was evaluated to be good.

(2) Occurrence of Gum:

Upon the above molding procedure, an outlet of the extrusion die and peripheral portions thereof were observed about whether or not any deposits were present thereon. The results were classified into the following five ranks.

5: Very small
4: Small
3: Normal
2: Large
1: Very large (3) Soft feeling:

The surface of the sheet specimen was touched by hands. The touch feelings were classified into the following five ranks.

5: Very soft
4: Soft
3: Normal
2: Hard
1: Very hard (4-1) Scratch Resistance:

A weight capable of applying a pressure of 159 g/cm$^2$ was put on a 10 mm-radius felt cloth placed on the sheet specimen, and reciprocated thereover 100 times to measure a gloss of the sheet specimen before and after the reciprocation test according to JIS-K7105. The scratch resistance of the specimen was evaluated by the change in gloss thereof between before and after the reciprocation test. The lower change value indicates a more excellent scratch resistance.

(4-2) Scratch Resistance:

According to JIS K5401, the surface of a thermoplastic elastomer layer of the laminate was scratched by a pencil (hardness: H) under an applied load of 500 g. After wiping off a carbon powder from the surface of the laminate, the surface condition thereof was visually observed. The results were classified into the following three ranks.

○: Uninjured
Δ: Substantially uninjured
X: Injured (4-3) Scratch Resistance:

Using a Taber scratch tester manufactured Toyo Seiki Seisaku-Sho, Ltd., the surface of a thermoplastic elastomer layer of the laminate was scratched by a tungsten carbide cutter under an applied load of 300 g, and then the surface condition thereof was visually observed. The results were classified into the following three ranks.

○: Uninjured
Δ: Substantially uninjured
X: Injured (5) Strength of Sheet:

The sheet specimen was laterally stamped into JIS #3 dumbbell specimen, and subjected to tensile test to measure a tensile break strength thereof at a drawing speed of 500 mm/min under ordinary temperature and ordinary pressure conditions.

(6-1) Retention of Emboss (Embossed Pattern) After Vacuum Forming:

Using a surface roughness shape measuring apparatus "SURFCOM 570A" manufactured by Tokyo Seimitsu Co., Ltd., the depths of emboss before and after the vacuum forming were measured at the same positions of the laminate to obtain an average roughness value of the ten measured values. The ratio of an average roughness value after the vacuum forming to that before the vacuum forming was calculated to determine an emboss retention rate Rz (%). According to the thus determined emboss retention rate Rz, the results were classified into the following four ranks.

| Rank | Rz |
|---|---|
| ⊙: | not less than 50% |
| ○: | not less than 40% and less than 50% |
| Δ: | not less than 35% and less than 40% |
| X: | less than 35% |

(6-2) Retention of Emboss (Embossed Pattern) After Vacuum Forming:

The laminate was heated until reaching a temperature of 100 to 130° C. at the surface thereof, and then subjected to female-draw vacuum forming so as to achieve a expansion ratio of 250%. The depths of emboss on the surface of the laminate were visually observed, and the results were classified into the following three ranks.
  ○: Good retention of emboss
  Δ: Normal
  X: Poor retention of emboss (7) Rupture or Break:

The surface of the laminate upon the vacuum forming was visually observed, and the results were classified into the following two ranks.
  ○: No ruptured or broken portions were observed
  X: Ruptured or broken portions were observed (8-1) Oil Resistance:

A single-layer sheet comprising the thermoplastic elastomer composition was immersed in light liquid paraffin, and allowed to stand therein at 80° C. for 24 hours. Thereafter, the sample sheet was taken out from the paraffin to wipe off the oil attached onto the surface thereof and measure the weight of the sheet. The percentage of change in weight between before and after the immersion was calculated according to the following formula:

$$\Delta W=(W2-W1)\times100/W1$$

wherein ΔW is a percentage (%) of change in weight of the sample; W1 is a weight of the sample in air before the immersion; and W2 is a weight of the sample in air after the immersion.

(8-2) Oil Resistance:

A single-layer sheet comprising the thermoplastic elastomer composition was immersed in light liquid paraffin, and allowed to stand therein at 80° C. for 24 hours. Thereafter, the surface of the sample sheet was visually observed. The results were classified into the following three ranks.
  ○: No wrinkle and unswelled
  Δ: Slight wrinkle and slightly swelled
  X: Significant wrinkle and swelled (9) Film Adhesion Property:

The surface of a top coat of each sample was cross-cut into a lattice (tessellated) pattern of 10×10 at intervals of 2 mm using a stainless steel cutter according to JIS D202. A cellophane tape ("LP24" produced by Nichiban Co., Ltd.) was fully attached under pressure on the lattice pattern of the top coat using a roll, and then intensively peeled off therefrom to count the number of remaining lattices. The film adhesion property was represented by the value obtained from the following formula:
  (Number of unpeeled lattices)/100

(10) R-sag Resistance:

Using a male-draw vacuum forming mold with a 5 mm-radius (5R) edge line, a sheet was vacuum-formed to measure a radius (R) of a back surface of the thus formed sheet. The results were classified into the following five ranks to evaluate the moldability thereof.
  5: R≦7 mm
  4: 7 mm<R≦9 mm
  3: 9 mm<R≦11 mm
  2: 11 mm<R≦13 mm
  1: R>13 mm

(11) Calendering Property:

A sheet wound on a roll was taken out and passed between twin rolls (calender rolls) heated to a temperature of 160 to 180° C. The results were classified into the following two ranks.

Good: No adhesion of the sheet onto the rolls, and uniform sheet having a uniform thickness and no waviness nor wrinkle was obtained; and Poor: Adhesion of the sheet onto the rolls, and non-uniform sheet having an uneven thickness was obtained.

(12) Oil-bleeding Resistance:

A calendered sheet was allowed to stand in an oven heated to 80° C. for 24 hours, and the surface thereof was visually observed about whether or not any bleeding of oil was caused. The results were classified into the following three ranks.
  ○: No oil bleeding
  Δ: Slight oil bleeding
  X: Significant oil bleeding EXAMPLES 1 to 5 AND COMPARATIVE EXAMPLES 1 AND 2

100 parts by weight of an elastomer composition containing components (a) to (c) at a blending ratio (weight part) as shown in Tables 1 and 2 was mixed with 0.1 part by weight of tetrakis[methylene-3-(3',5'-di-t-butyl-4'-hydroxyphenyl)propionate]methane (tradename: "IRGANOX 1010" produced by Ciba Specialty Chemicals Corp.) as an antioxidant and then with POX and DVB respectively in an amount as shown in Tables 1 and 2. The resultant mixture was melt-kneaded using a twin-screw extruder having a ratio L/D of 41 and a cylinder diameter of 44 mm which was set to a temperature of 110 to 180° C., extruded into strands through an extrusion die, and cut into pellets comprising the thermoplastic elastomer composition. The thus obtained pellets were extrusion-molded into a sheet, and the obtained sheet was evaluated by the above-described methods. The evaluation results are shown in Tables 1 and 2.

COMPARATIVE EXAMPLE 3

The same procedure as defined above was conducted except that a dynamically crosslinked product of a blended mixture of an ethylene-propylene-non-conjugated diene copolymer rubber and polypropylene ("THERMOLAN 3602N" produced by Mitsubishi Chemical Corporation) was used as the olefin-based thermoplastic elastomer. Various properties of the obtained product were evaluated. The evaluation results are shown in Table 2.

TABLE 1

|  | Examples | | | | |
| --- | --- | --- | --- | --- | --- |
|  | 1 | 2 | 3 | 4 | 5 |
| Composition (weight part) | | | | | |
| a1 | 36 | — | 36 | — | — |
| a2 | — | 36 | — | 36 | — |
| a3 | — | — | — | — | 36 |
| a4 | — | — | — | — | — |
| b | 44 | 44 | 44 | 44 | 44 |
| a/b | 45/55 | 45/55 | 45/55 | 45/55 | 45/55 |
| c | 20 | 20 | 20 | 20 | 20 |
| c/(a + b) | 25/100 | 25/100 | 25/100 | 25/100 | 25/100 |
| POX | — | — | 0.3 | 0.3 | 0.3 |
| DVB | — | — | 0.4 | 0.4 | 0.4 |
| Evaluation | | | | | |
| Moldability | Good | Good | Good | Good | Good |
| Gum | 5 | 5 | 4 | 4 | 4 |
| Soft feeling | 5 | 5 | 5 | 5 | 5 |

TABLE 1-continued

| | Examples | | | | |
|---|---|---|---|---|---|
| | 1 | 2 | 3 | 4 | 5 |
| Scratch resistance (change in gloss) | Good (7/6.5) | Good (14.2/13.2) | Good (6.5/6.5) | Good (8.9/8.4) | Good (9.8/9.7) |
| Sheet strength | 13.0 | 14.0 | 13.8 | 14.8 | 9.7 |

TABLE 2

| | Comparative Examples | | |
|---|---|---|---|
| | 1 | 2 | 3 |
| Composition (weight part) | | | |
| a1 | — | — | Olefin-based thermoplastic elastomer |
| a2 | — | — | |
| a3 | — | — | |
| a4 | 36 | 36 | |
| b | 44 | 44 | |
| a/b | 45/55 | 45/55 | |
| c | 20 | 20 | |
| c/(a + b) | 25/100 | 25/100 | |
| POX | — | 0.3 | |
| DVB | — | 0.4 | |
| Evaluation | | | |
| Moldability | Poor (draw-down) | Poor (draw-down) | Good |
| Gum | 5 | 4 | 2 |
| Soft feeling | 5 (sticky) | 5 (sticky) | 5 (sticky) |
| Scratch resistance (change in gloss) | Poor (32.4/12.3) | Poor (28.5/11.5) | Good (6.4/3.2) |
| Sheet strength | 5.4 | 5.5 | 5.1 |

EXAMPLES 6 AND COMPARATIVE EXAMPLES 4 AND 5

(1) Production of Thermoplastic Elastomer:

100 parts by weight of an elastomer composition containing components (a) to (c) at a blending ratio (weight part) as shown in Tables 3 and 4 was mixed with 0.1 part by weight of tetrakis[methylene-3-(3',5'-di-t-butyl-4'-hydroxyphenyl)propionate]methane (tradename: "IRGANOX 1010" produced by Ciba Specialty Chemicals Corp.) and then with POX and DVB respectively in an amount as shown in Tables 3 and 4. The resultant mixture was melt-kneaded using a twin-screw extruder having a ratio L/D of 41 and a cylinder diameter of 44 mm which was set to a temperature of 110 to 180° C., extruded into strands through an extrusion die, and cut into pellets comprising the thermoplastic elastomer composition.

(2) Production of Laminate:

The thus obtained pellets of the thermoplastic elastomer composition were extruded into a sheet having a width of 250 mm and a thickness of 0.35 mm from a T-die of a 45 mmϕ extruder (with a single flight screw) manufactured by Watanabe Kakoki Co., Ltd., at a cylinder temperature of 190° C., a die temperature of 210° C. and a screw rotating speed of 70 rpm. Successively, the obtained sheet was passed between an embossing (embossed pattern-forming) roll (30° C.) and a pressure rubber roll while overlapping a crosslinked foam sheet comprising a polypropylene resin (expansion ratio: 10 times; thickness: 1 mm) on the pressure rubber roll-side surface of the sheet, thereby producing a laminate comprising the thermoplastic elastomer composition layer and the polypropylene resin crosslinked foam layer. Various properties of the thus obtained laminate were evaluated. The evaluation results are shown in Tables 3 and 4.

(3) Vacuum Forming:

The thus formed laminate was heated by an infrared heater until reaching a temperature of 100 to 130° C. at the surface thereof, and then subjected to female-draw vacuum forming process using a vacuum forming machine "FCP-4APA-W-30-L" manufactured by Asano Laboratories Co., Ltd., so as to achieve an expansion ratio of 250%. Various properties of the thus vacuum-formed product were evaluated. The evaluation results are shown in Tables 3 and 4.

COMPARATIVE EXAMPLE 6

The same procedure as defined above was conducted except that a dynamically crosslinked product of a blended mixture of an ethylene-propylene-non-conjugated diene copolymer rubber and polypropylene ("THERMOLAN 3602N" produced by Mitsubishi Chemical Corporation) was used as the olefin-based thermoplastic elastomer. Various properties of the obtained product were evaluated. The evaluation results are shown in Table 4.

TABLE 3

| | Examples | | | | |
|---|---|---|---|---|---|
| | 6 | 7 | 8 | 9 | 10 |
| Composition (weight part) | | | | | |
| a1 | 36 | — | 36 | — | — |
| a2 | — | 36 | — | 36 | — |
| a3 | — | — | — | — | 36 |
| a5 | — | — | — | — | — |
| b | 44 | 44 | 44 | 44 | 44 |
| a/b | 45/55 | 45/55 | 45/55 | 45/55 | 45/55 |
| c | 20 | 20 | 20 | 20 | 20 |
| c/(a + b) | 25/100 | 25/100 | 25/100 | 25/100 | 25/100 |
| POX | — | — | 0.3 | 0.3 | 0.3 |
| DVB | — | — | 0.4 | 0.4 | 0.4 |
| Evaluation | | | | | |
| Moldability | Good | Good | Good | Good | Good |
| Gum | 5 | 5 | 4 | 4 | 4 |
| Soft feeling | 5 | 5 | 5 | 5 | 5 |
| Scratch resistance | ○ | ○ | ○ | ○ | ○ |
| Emboss retention after vacuum forming | ◎ | ◎ | ◎ | ◎ | ○ |
| Rz retention rate (%) | 52 | 54 | 57 | 59 | 48 |
| Rupture or break upon vacuum forming | ○ | ○ | ○ | ○ | ○ |

TABLE 4

|  | Comparative Examples | | |
|---|---|---|---|
|  | 4 | 5 | 6 |
| Composition (weight part) | | | |
| a1 | — | — | Olefin-based thermoplastic elastomer |
| a2 | — | — | |
| a3 | — | — | |
| a5 | 36 | 36 | |
| b | 44 | 44 | |
| a/b | 45/55 | 45/55 | |
| c | 20 | 20 | |
| c/(a + b) | 25/100 | 25/100 | |
| POX | — | 0.3 | |
| DVB | — | 0.4 | |
| Evaluation | | | |
| Moldability | Poor (draw-down) | Poor (draw-down) | Good |
| Gum | 5 | 4 | 2 |
| Soft feeling | 5 (sticky) | 5 (sticky) | 5 |
| Scratch resistance | X | Δ | X |
| Emboss retention after vacuum forming | Δ | ○ | Δ |
| Rz retention rate (%) | 33 | 35 | 30 |
| Rupture or break upon vacuum forming | X | X | ○ |

Evaluation of Results:

1) In Comparative Example 4 using the component (a5) having a weight-average molecular weight out of the range specified by the present invention, the obtained product suffered from poor moldability and stickiness and was deteriorated in scratch resistance, emboss retention after vacuum forming, resistance to rupture or break upon vacuum forming and oil resistance as compared to those obtained in the corresponding Examples 1 and 2.

2) In Comparative Example 5 also using the component (a5) having a weight-average molecular weight out of the range specified by the present invention, the obtained product suffered from poor moldability and stickiness and was deteriorated in scratch resistance, emboss retention after vacuum forming, resistance to rupture or break upon vacuum forming and oil resistance as compared to those obtained in the corresponding Examples 8, 9 and 10.

3) In Comparative Example 6 using the olefin-based thermoplastic elastomer, the obtained product suffered from formation of gum and was deteriorated in scratch resistance, emboss retention after vacuum forming and oil resistance as compared to those obtained in the corresponding Examples 6 to 10.

EXAMPLES 11 to 15 COMPARATIVE EXAMPLES 7 AND 8

(1) Production of Thermoplastic Elastomer:

100 parts by weight of an elastomer composition containing components (a) to (c) at a blending ratio (weight part) as shown in Tables 5 and 6 was mixed with 0.1 part by weight of tetrakis[methylene-3-(3',5'-di-t-butyl-4'-hydroxyphenyl) propionate]methane (tradename: "IRGANOX 1010" produced by Ciba Specialty Chemicals Corp.) as an antioxidant and then with POX and DVB respectively in an amount as shown in Tables 5 and 6. The resultant mixture was melt-kneaded using a twin-screw extruder having a compression ratio L/D of 41 and a cylinder diameter of 44 mm which was set to a temperature of 180° C., extruded into strands through an extrusion die, and cut into pellets comprising the thermoplastic elastomer composition.

(2) Production of Laminate:

The thus obtained pellets comprising the thermoplastic elastomer composition were mixed with the component (d) in an amount as shown in Tables 5 and 6, stirred together and then extruded into a sheet having a width of 250 mm and a thickness of 0.35 mm from a T-die of a 45 mmϕ extruder (with a single flight screw) manufactured by Watanabe Kakoki Co., Ltd., at a cylinder temperature of 190° C., a die temperature of 210° C. and a screw rotating speed of 70 rpm. Successively, the obtained sheet was passed between an embossing (embossed pattern-forming) roll (30° C.) and a pressure rubber roll while overlapping a crosslinked foam sheet comprising a polypropylene resin ("TRC Polymer" produced by Mitsubishi Chemical Corporation; expansion ratio: 10 times; thickness: 1 mm) on the pressure rubber roll-side surface of the sheet, thereby producing a laminate comprising the thermoplastic elastomer composition layer and the polypropylene resin crosslinked foam layer. Various properties of the thus obtained laminate were evaluated. The evaluation results are shown in Tables 5 and 6.

(3) Vacuum Forming:

The thus formed laminate was heated by an infrared heater until reaching a temperature of 100 to 130° C. at the surface thereof, and then subjected to female-draw vacuum forming process using a vacuum forming machine "FCP-4APA-W-30-L" manufactured by Asano Laboratories Co., Ltd., so as to achieve a expansion ratio of 200%. Various properties of the obtained product were evaluated. The evaluation results are shown in Tables 5 and 6.

COMPARATIVE EXAMPLE 9

The same procedure as defined above was conducted except that a dynamically crosslinked product of a blended mixture of polypropylene and an ethylene-propylene-non-conjugated diene copolymer rubber ("THERMOLAN 3602N" produced by Mitsubishi Chemical Corporation) was used as the olefin-based thermoplastic elastomer. Various properties of the obtained product were evaluated. The evaluation results are shown in Table 6. Meanwhile, blank portions in Table 6 mean that the amount of component added was "0".

TABLE 5

|  | Examples | | | | |
|---|---|---|---|---|---|
|  | 11 | 12 | 13 | 14 | 15 |
| Composition (weight part) | | | | | |
| a1 | 36 | — | 36 | — | — |
| a2 | — | 36 | — | 36 | — |
| a3 | — | — | — | — | 36 |
| a5 | — | — | — | — | — |
| b | 44 | 44 | 44 | 44 | 44 |
| a/b | 45/55 | 45/55 | 45/55 | 45/55 | 45/55 |
| c | 20 | 20 | 20 | 20 | 20 |
| c/(a + b) | 25/100 | 25/100 | 25/100 | 25/100 | 25/100 |
| d | 43 | 43 | 43 | 43 | 43 |
| d/(a + b) | 53.8 | 53.8 | 53.8 | 53.8 | 53.8 |

TABLE 5-continued

| | Examples | | | | |
|---|---|---|---|---|---|
| | 11 | 12 | 13 | 14 | 15 |
| POX | — | — | 0.3 | 0.3 | 0.3 |
| DVB | — | — | 0.4 | 0.4 | 0.4 |
| Evaluation | | | | | |
| Moldability | Good | Good | Good | Good | Good |
| Gum | 5 | 5 | 5 | 5 | 4 |
| Soft feeling | 4 | 4 | 4 | 4 | 4 |
| Scratch resistance | Δ | Δ | ◯ | ◯ | Δ |
| Emboss retention after vacuum forming | Δ | Δ | ◯ | ◯ | ◯ |
| Rupture or break upon vacuum forming | ◯ | ◯ | ◯ | ◯ | ◯ |
| Oil resistance (%) | 45 | 46 | 41 | 39 | 60 |

TABLE 6

| | Comparative Examples | | |
|---|---|---|---|
| | 7 | 8 | 9 |
| Composition (weight part) | | | |
| a1 | — | — | Olefin-based thermoplastic elastomer |
| a2 | — | — | |
| a3 | — | — | |
| a5 | 36 | 36 | |
| b | 44 | 44 | |
| a/b | 45/55 | 45/55 | |
| c | 20 | 20 | |
| c/(a + b) | 25/100 | 25/100 | |
| d | 43 | 43 | |
| d/(a + b) | 53.8 | 53.8 | |
| POX | — | 0.3 | |
| DVB | — | 0.4 | |
| Evaluation | | | |
| Moldability | Poor | Poor | Good |
| Gum | 5 | 5 | 3 |
| Soft feeling | 4 (sticky) | 4 (sticky) | 4 |
| Scratch resistance | X | X | X |
| Emboss retention after vacuum forming | X | Δ | Δ |
| Rupture or break upon vacuum forming | X | X | ◯ |
| Oil resistance (%) | 98 | 78 | 93 |

Evaluation of Results:

1) In Comparative Example 7 using the component (a4) having a weight-average molecular weight out of the range specified by the present invention, the obtained product suffered from poor moldability and stickiness and was deteriorated in scratch resistance, emboss retention after vacuum forming, resistance to rupture or break upon vacuum forming and oil resistance as compared to those obtained in the corresponding Examples 11 and 12.

2) In Comparative Example 8 also using the component (a4) having a weight-average molecular weight out of the range specified by the present invention, the obtained product suffered from poor moldability and stickiness and was deteriorated in scratch resistance, emboss retention after vacuum forming, resistance to rupture or break upon vacuum forming and oil resistance as compared to those obtained in the corresponding Examples 13, 14 and 15.

3) In Comparative Example 9 using the olefin-based thermoplastic elastomer, the obtained product suffered from deposition of gum and was deteriorated in scratch resistance, emboss retention after vacuum forming and oil resistance as compared to those obtained in the corresponding Examples 11 to 15.

EXAMPLES 16 to 20 AND COMPARATIVE EXAMPLES 10 AND 11

(1) Production of Thermoplastic Elastomer:

100 parts by weight of an elastomer composition containing components (a) to (c) at a blending ratio (weight part) as shown in Tables 7 and 8 was mixed with 0.1 part by weight of tetrakis[methylene-3-(3',5'-di-t-butyl-4'-hydroxyphenyl)propionate]methane (tradename: "IRGANOX 1010" produced by Ciba Specialty Chemicals Corp.) and then with POX and DVB respectively in an amount as shown in Tables 7 and 8. The resultant mixture was melt-kneaded using a twin-screw extruder having a compression ratio L/D of 41 and a cylinder diameter of 44 mm in which the respective cylinder portions were set to a temperature of 110 to 200° C., extruded into strands through an extrusion die, and cut into pellets comprising the thermoplastic elastomer composition.

(2) Production of Laminate:

The thus obtained pellets comprising the thermoplastic elastomer composition were extruded into a sheet having a width of 250 mm and a thickness of 0.35 mm from a T-die of a 45 mmφ extruder (with a single flight screw) manufactured by Watanabe Kakoki Co., Ltd., at a cylinder temperature of 190° C., a die temperature of 210° C. and a screw rotating speed of 70 rpm. Successively, the obtained sheet was passed between an embossing (embossed pattern-forming) roll (30° C.) and a pressure rubber roll while overlapping a crosslinked foam sheet comprising a mixture of a polypropylene resin and a polyethylene resin ("TRC Polymer" produced by Mitsubishi Chemical Corporation; expansion ratio: 10 times; thickness: 1 mm) on the pressure rubber roll-side surface of the sheet, thereby producing a laminate comprising the thermoplastic elastomer composition layer and the crosslinked foam layer. Further, the surface of the obtained laminate opposed to the crosslinked foam layer was subjected to corona discharge treatment such that a wet tensile strength thereof was 40 mN/m, and then a chlorinated polypropylene-based primer ("HI-COPE U AD402" produced by Tokushiki Co., Ltd.) and a yellowing-free urethane-based top coat ("HI-COPE U EU110M" produced by Tokushiki Co., Ltd.) were applied onto the corona discharge-treated surface in a coating amount of 40 g/m² and 70 g/m² (under wetted condition), respectively, by a spray-coating method. Various properties of the thus obtained laminate with the top coat were evaluated. The evaluation results are shown in Tables 7 and 8.

COMPARATIVE EXAMPLE 12

The same procedure as defined above was conducted except that a dynamically crosslinked product of a blended mixture of polypropylene and an ethylene-propylene-nonconjugated diene copolymer rubber ("THERMOLAN 3602N" produced by Mitsubishi Chemical Corporation) was used as the olefin-based thermoplastic elastomer. Various properties of the obtained product were evaluated. The evaluation results are shown in Table 8.

TABLE 7

| | Examples | | | | |
|---|---|---|---|---|---|
| | 16 | 17 | 18 | 19 | 20 |
| Composition (weight part) | | | | | |
| a1 | 45 | — | 45 | — | — |
| a2 | — | 45 | — | 45 | — |
| a3 | — | — | — | — | 45 |
| a5 | — | — | — | — | — |
| b | 55 | 55 | 55 | 55 | 55 |
| c | 25 | 25 | 25 | 25 | 25 |
| POX | — | — | 0.3 | 0.3 | 0.3 |
| DVB | — | — | 0.4 | 0.4 | 0.4 |
| Evaluation | | | | | |
| Gum | 5 | 5 | 5 | 5 | 4 |
| Soft feeling | 5 | 5 | 5 | 5 | 4 |
| Scratch resistance | Δ | Δ | ○ | ○ | Δ |
| Oil resistance | ○ | ○ | ○ | ○ | ○ |
| Film adhesion property | 100/100 | 100/100 | 100/100 | 100/100 | 100/100 |

TABLE 8

| | Comparative Examples | | |
|---|---|---|---|
| | 10 | 11 | 12 |
| Composition (weight part) | | | |
| a1 | — | — | Olefin-based thermoplastic elastomer |
| a2 | — | — | |
| a3 | — | — | |
| a5 | 45 | 45 | |
| b | 55 | 55 | |
| c | 25 | 25 | |
| POX | — | 0.3 | |
| DVB | — | 0.4 | |
| Evaluation | | | |
| Gum | 5 | 4 | 3 |
| Soft feeling | 4 (sticky) | 4 (sticky) | 4 |
| Scratch resistance | X | X | X |
| Oil resistance | X | Δ | Δ |
| Film Adhesion property | 3/100 | 5/100 | 12/100 |

EXAMPLES 21 to 23, REFERENCE EXAMPLES 1 AND 2 AND COMPARATIVE EXAMPLE 13

(1) Production of Thermoplastic Elastomer:

A mixture obtained by mixing the components together at a blending ratio as shown in Table 9 was melt-kneaded using a twin-screw extruder having a compression ratio L/D of 41 and a cylinder diameter of 44 mm which was set to a temperature of 150 to 200° C., extruded into strands through an extrusion die, and cut into pellets comprising TPS(A) and TPS(B).

(2) Production of Skin Sheet:

The thus obtained TPS pellets were blended together in an amount as shown in Tables 10 and 11, extruded into a sheet having a width of 250 mm and a thickness of 0.35 mm from a T-die of a 45 mmφ extruder (with a single flight screw) manufactured by Watanabe Kakoki Co., Ltd., at a cylinder temperature of 190° C., a die temperature of 210° C. and a screw rotating speed of 70 rpm. Successively, the obtained sheet was passed between an embossing (embossed pattern-forming) roll (30° C.) and a pressure rubber roll while overlapping a crosslinked foam sheet comprising a polypropylene-based resin ("TRC Polymer" produced by Mitsubishi Chemical Corporation; expansion ratio: 10 times; thickness: 1 mm) on the pressure rubber roll-side surface of the sheet, thereby producing a laminate comprising the styrene-based thermoplastic elastomer composition layer and the crosslinked foam layer. Various properties of the thus obtained laminate were evaluated. The evaluation results are shown in Tables 10 and 11.

(3) Vacuum Forming:

The thus obtained laminate was vacuum-formed using a vacuum forming machine "FCP-4APA-W-30-L" manufactured by Asano Laboratories Co., Ltd. The thus obtained vacuum-formed product was subjected to the above evaluations (6-2), (7) and (10). The results are shown in Tables 10 and 11.

REFERENCE EXAMPLE 3

The TPS(C) was produced by the same method as defined in Example 21. The styrene-based thermoplastic elastomer composition comprising only the thus produced TPS(C) was subjected to the above production of skin sheet and vacuum forming process to produce a single-layer sheet, a laminate and a vacuum-formed product. Various properties of the thus obtained products were evaluated. The results are shown in Table 11.

COMPARATIVE EXAMPLE 14

The same procedure as defined in Example 21 was conducted except that the olefin-based thermoplastic elastomer having a hardness substantially identical to those of the above TPS(A)-1 and TPS(B)-1 (dynamically crosslinked product comprising a blended mixture of polypropylene and an ethylene-propylene-non-conjugated diene copolymer rubber; "THERMOLAN 3652N" or "THERMOLAN 3981N" produced by Mitsubishi Chemical Corporation) was used instead of the styrene-based thermoplastic elastomer composition, thereby producing a single-layer sheet, a laminate and a vacuum-formed product. Various properties of the obtained products were evaluated. The results are shown in Table 11.

TABLE 9

| Composition (weight part) | TPS (A)-1 | TPS (A)-2 | TPS (A)-3 | TPS (B)-1 | TPS (B)-2 | TPS (B)-3 | TPS (C) |
|---|---|---|---|---|---|---|---|
| a1 | 45 | | 45 | 45 | | | 45 |
| a5 | | 45 | | | 45 | | |
| b | 55 | 55 | 55 | 55 | 55 | 55 | 55 |
| c | 20 | 20 | 20 | 60 | 60 | 60 | 40 |
| IX1010 | 0.1 | 0.1 | 0.1 | 0.1 | 0.1 | 0.1 | 0.1 |
| POX | — | 0.3 | — | — | 0.3 | — | — |
| DVB | — | 0.4 | — | — | 0.4 | — | — |

TABLE 10

| | Examples | | | Reference |
|---|---|---|---|---|
| | 21 | 22 | 23 | Example 1 |
| Composition (weight part) | | | | |
| TSP (A)-1 | 50 | — | 50 | 100 |

TABLE 10-continued

|  | Examples | | | Reference |
| --- | --- | --- | --- | --- |
|  | 21 | 22 | 23 | Example 1 |
| TSP (A)-2 | — | 50 | — | — |
| TSP (A)-3 | — | — | — | — |
| TSP (B)-1 | 50 | — | 50 | — |
| TSP (B)-2 | — | 50 | — | — |
| TSP (B)-3 | — | — | — | — |
| TSP (C) | — | — | — | — |
| d | — | — | 43 | — |
| Evaluation | | | | |
| Gum | 5 | 5 | 5 | 5 |
| Scratch resistance | Δ | Δ | ○ | Δ |
| Emboss retention after vacuum forming | ○ | ○ | ○ | X |
| Rupture or break upon vacuum forming | ○ | ○ | ○ | ○ |
| R-sag resistance | 5 | 5 | 5 | 5 |
| Oil resistance (%) | 52 | 42 | 36 | 62 |

TABLE 11

|  | Reference Example 2 | Comp. Example 13 | Reference Example 3 | Comp. Example 14 |
| --- | --- | --- | --- | --- |
| Composition (weight part) | | | | |
| TSP (A)-1 | — | — | — | Olefin-based thermoplastic elastomer |
| TSP (A)-2 | — | — | — | |
| TSP (A)-3 | — | 50 | — | |
| TSP (B)-1 | 100 | — | — | |
| TSP (B)-2 | — | — | — | |
| TSP (B)-3 | — | 50 | — | |
| TSP (C) | — | — | 100 | |
| d | — | — | — | |
| Evaluation | | | | |
| Gum | 5 | 5 (defective molding) | 5 | 3 |
| Scratch resistance | Δ | X | Δ | X |
| Emboss retention after vacuum forming | ○ | Δ | Δ | Δ |
| Rupture or break upon vacuum forming | ○ | X | ○ | ○ |
| R-sag resistance | 2 | 3 | 3 | 4 |
| Oil resistance (%) | 48 | 98 | 55 | 112 |

EXAMPLES 24 AND 25, REFERENCE EXAMPLE 4 AND COMPARATIVE EXAMPLE 15

100 parts by weight of an elastomer composition containing components (a) to (c) at a blending ratio (weight part) as shown in Table 12 was mixed with 0.1 part by weight of tetrakis[methylene-3-(3',5'-di-t-butyl-4'-hydroxyphenyl) propionate]methane (tradename: "IRGANOX 1010" produced by Ciba Specialty Chemicals Corp.) as an antioxidant and then with POX and DVB respectively in an amount as shown in Table 12. The resultant mixture was melt-kneaded and dynamically heat-treated using a twin-screw extruder having a compression ratio L/D of 41 and a cylinder diameter of 44 mm which was set to a temperature of 110 to 200° C., extruded into strands through an extrusion die, and then cut into pellets comprising the thermoplastic elastomer composition. The thus obtained pellets were blended with components (e) and (c) respectively in an amount as shown in Table 12, melt-kneaded again in an extruder, and extruded therefrom into pellets. The thus obtained pellets were evaluated by the above-described methods. The evaluation results are shown in Table 12.

COMPARATIVE EXAMPLE 16

A dynamically crosslinked product of a blended mixture of propylene and an ethylene-propylene-non-conjugated diene copolymer rubber ("THERMOLAN 3602N" produced by Mitsubishi Chemical Corporation) as the olefin-based thermoplastic elastomer was pelletized, and the obtained pellets were mixed with components (e) and (c) respectively in an amount as shown in Table 12, melt-kneaded again in an extruder, and then extruded into pellets therefrom. The evaluation results are shown in Table 12.

TABLE 12

|  | Examples | | Com. Ex. | Ref. Ex. | Com. Ex. |
| --- | --- | --- | --- | --- | --- |
|  | 24 | 25 | 15 | 4 | 16 |
| Composition (weight part) | | | | | |
| a1 | 45 | 45 | — | 45 | Olefin-based thermoplastic elastomer |
| a5 | — | — | 45 | — | |
| b | 55 | 55 | 55 | 55 | |
| c | 25 | 25 | 25 | 25 | |
| e | 0.5 | 0.5 | 0.5 | — | 0.5 |
| f | 54 | 54 | 54 | — | 54 |
| POX | — | 0.375 | — | — | — |
| DVB | — | 0.5 | — | — | — |
| Evaluation | | | | | |
| Calendering property | Good | Good | Poor | Poor | Good |
| Scratch resistance | Δ | ○ | Δ | Δ | X |
| Oil resistance (%) | 44 | 33 | 109 | 52 | 121 |
| Oil-bleeding resistance | ○ | ○ | X | ○ | ○ |

INDUSTRIAL APPLICABILITY

According to the present invention, there are provided a sheet and a laminate which are excellent in not only extrusion-moldability, scratch resistance, oil resistance and soft feeling, but also uniform spreadability and retention of emboss (embossed pattern), and usefully applicable to interior materials for automobile parts, for example, skin materials for instrument panels, door trims, console boxes, ceiling sheets and steering wheel pads, or leather sheets for seats, as well as skin materials for furniture. Therefore, the present invention can provide remarkable industrial values.

The invention claimed is:

1. A laminate with an embossed surface, comprising a base layer and a layer comprising thermoplastic elastomer composition comprising:
(a) a block copolymer having a weight-average molecular weight of 80,000 to 1,000,000 which is represented by the general formula (I):

$$A(B-A)_n \text{ and/or } (A-B)_n \qquad (I)$$

wherein A is a block of a polymer of a vinyl aromatic hydrocarbon; B is a block of an elastomeric polymer; and n is an integer of 1 to 5, and/or
   a hydrogenated block copolymer obtained by hydrogenating said block copolymer;
(b) a softening agent for hydrocarbon-based rubbers; and
(c) an olefin-based resin,
   said component (a) being contained in an amount of 25 to 75% by weight, and said component (b) being contained in an amount of 25 to 75% by weight, both based on a total weight of the components (a) and (b), and said component (c) being contained in an amount of 1 to 300 parts by weight based on 100 parts by weight of a total amount of the components (a) and (b)
   wherein said thermoplastic elastomer composition is at least partially crosslinked by dynamic heat treatment.

2. A laminate according to claim 1, wherein the block B in the general formula (I) is a block of an elastomeric polymer of a conjugated diene.

3. A laminate according to claim 1 or 2, wherein said component (c) is a propylene-based polymer.

4. A laminate according to claim 1, wherein the block A in the general formula (I) is a styrene polymer block, the block B is a butadiene polymer block, an isoprene polymer block or a butadiene-isoprene polymer block, and a content of the block A in the component (a) is in the range of 10 to 50% by weight.

5. A laminate according to claim 1, further comprising (d) an olefin-based resin other than said olefin-based resin (c) in an amount of 5 to 1,200 parts by weight based on 100 parts by weight of a total amount of the components (a) and (b).

6. A laminate according to claim 5, wherein said thermoplastic elastomer composition is prepared by heat-treating a mixture of the components (a) to (c), and then adding the component (d) to the heat-treated mixture.

7. A thermoplastic elastomer composition according to claim 5 or 6, wherein said component (d) is an ethylene-based resin or a mixture of the ethylene-based resin and a propylene-based resin.

8. A laminate according to claim 7, wherein said ethylene-based resin as the component (d) is a mixture of an ethylene-based resin having a density of less than 0.91 g/cm³, and an ethylene-based resin having a density of not less than 0.91 g/cm³.

9. A laminate according to claim 6, wherein said heat treatment is conducted in the presence of a radical generator.

10. A laminate according to claim 6, wherein said heat treatment is conducted in the presence of a radical generator and a crosslinking assistant.

11. A laminate composition according to claim 1, further comprising (e) a higher fatty acid amide in an amount of 0.03 to 3 parts by weight based on 100 parts by weight of a total amount of the components (a) and (b), and said composition is dynamically heat-treated.

12. A laminate composition according to claim 11, wherein said component (e) is added to the composition before and/or after the heat treatment.

13. A laminate according to claim 11 or 12, wherein said thermoplastic elastomer composition is a thermoplastic elastomer composition used for calendering.

14. A laminate according to claim 11, further comprising an olefin-based resin (f) in an amount of 5 to 200 parts by weight based on 100 parts by weight of a total amount of the components (a) and (b).

15. A laminate according to claim 14, wherein said component (f) is a propylene-based resin, an ethylene-based resin or a mixture of these resins.

16. A laminate according to claim 15, wherein said ethylene-based resin as the component (f) is a mixture of an ethylene-based resin having a density of less than 0.910 g/cm³, and an ethylene-based resin having a density of not less than 0.910 g/cm³.

17. A laminate with an embossed surface, comprising a base layer and a layer comprising thermoplastic elastomer composition comprising:
(A) a thermoplastic elastomer obtained by dynamically heat-treating the thermoplastic elastomer composition as defined in claim 1 which contains 40 to 60% by weight of the component (a), 60 to 40% by weight of the component (b), and the component (c) in an amount of 10 to 30 parts by weight based on 100 parts by weight of a total amount of the components (a) and (b); and
(B) a thermoplastic elastomer obtained by dynamically heat-treating the thermoplastic elastomer composition as defined in claim 1 which contains 40 to 60% by weight of the component (a) and 60 to 40% by weight of the component (b), and the component (c) in an amount of 40 to 100 parts by weight based on 100 parts by weight of a total amount of the components (a) and (b),
a ratio of the thermoplastic elastomer (A) to the thermoplastic elastomer (B) being in the range of 20:80 to 80:20
wherein said thermoplastic elastomer composition is at least partially crosslinked.

18. A laminate according to claim 17, further comprising an olefin-based resin (g) in an amount of 5 to 100 parts by weight based on 100 parts by weight of the thermoplastic elastomer composition.

19. A laminate according to claim 18, wherein said component (g) is a propylene-based resin and/or an ethylene-based resin.

20. A laminate composition according to claim 19, wherein said ethylene-based resin is a mixture of an ethylene-based resin having a density of less than 0.910 g/cm³, and an ethylene-based resin having a density of not less than 0.910 g/cm³.

21. A laminate with an embossed surface, comprising a base layer and a layer comprising the thermoplastic elastomer composition as defined in claim 1.

22. A laminate with an embossed surface, comprising a base layer and a layer comprising the thermoplastic elastomer composition according claim 21, wherein said sheet is produced by an extrusion molding method.

23. A laminate with an embossed surface, comprising a base layer and a layer having a thermoplastic elastomer skin sheet comprising the thermoplastic elastomer composition as defined in claim 17.

24. A laminate according to claim 1, wherein said base layer comprises a polyolefin-based resin.

25. A laminate according to claim 1 or 24, wherein said base layer is a foam layer comprising a polyethylene-based resin, a polypropylene-based resin or a mixture of these resins.

26. A laminate according to claim 25, wherein said foam is a crosslinked foam.

27. An embossable laminate comprising:
   a layer comprising the thermoplastic elastomer composition as defined in claim 1, and
   a top coat layer.

28. An embossable laminate according to claim 27, wherein the layer comprising the thermoplastic elastomer composition is further provided on a surface thereof with a primer layer, and the top coat layer is formed on the primer layer.

29. An embossable laminate according to claim 27, wherein after a surface of the layer comprising the thermoplastic elastomer composition is subjected to corona discharge treatment, the primer layer is formed on the thus treated surface, and the top coat layer is formed on the primer layer.

30. An embossable laminate according to claim 27, wherein the top coat layer is formed from an urethane-based coating material.

31. An embossable laminate according to claim 28, wherein the primer layer contains at least one compound selected from the group consisting of saturated polyesters and chlorinated polyolefins.

32. A laminate according to claim 1 produced by extrusion molding.

33. A laminate according to claim 1 wherein the base layer is a foam layer.

34. A laminate according to claim 33 wherein the foam base layer is at least partially crosslinked.

* * * * *